US010423812B2

(12) United States Patent
Enomoto et al.

(10) Patent No.: US 10,423,812 B2
(45) Date of Patent: Sep. 24, 2019

(54) TAG READER CALCULATING MINIMUM DISTANCE BETWEEN ANTENNA AND TAG

(71) Applicant: DENSO WAVE INCORPORATED, Chita-gun, Aichi-pref. (JP)

(72) Inventors: Kohei Enomoto, Chita-gun (JP); Masayuki Ogawa, Chita-gun (JP)

(73) Assignee: DENSO WAVE INCORPORATED, Chita-gun, Aichi-pref. (JP)

( * ) Notice: Subject to any disclaimer, the term of this patent is extended or adjusted under 35 U.S.C. 154(b) by 0 days.

(21) Appl. No.: 15/911,274

(22) Filed: Mar. 5, 2018

(65) Prior Publication Data
US 2018/0260593 A1 Sep. 13, 2018

(30) Foreign Application Priority Data

Mar. 7, 2017 (JP) .................................. 2017-043150
Mar. 29, 2017 (JP) .................................. 2017-065440

(51) Int. Cl.
*G06K 7/10* (2006.01)
(52) U.S. Cl.
CPC ..... *G06K 7/10435* (2013.01); *G06K 7/10009* (2013.01); *G06K 7/10316* (2013.01)
(58) Field of Classification Search
CPC ........... G06K 7/10009; G06K 7/10316; G06K 7/10435
USPC ....................................................... 235/451
See application file for complete search history.

(56) References Cited

U.S. PATENT DOCUMENTS

| 2010/0328073 A1* | 12/2010 | Nikitin | .................. | G01S 5/0247 340/572.1 |
| 2012/0146774 A1 | 6/2012 | Kasai et al. | | |
| 2014/0022059 A1* | 1/2014 | Horst | ................. | G06K 7/10009 340/10.3 |
| 2016/0157828 A1* | 6/2016 | Sumi | .................. | G01N 29/0654 702/189 |

FOREIGN PATENT DOCUMENTS

| JP | 2006-072672 A | 3/2006 |
| JP | 2012-098863 A | 5/2012 |

* cited by examiner

*Primary Examiner* — Toan C Ly
(74) *Attorney, Agent, or Firm* — Harness, Dickey & Pierce, P.L.C.

(57) ABSTRACT

A tag reader includes: a phase calculation section that sequentially calculates a phase of a reception wave; a phase difference calculation section that calculates a phase difference as a difference of phases calculated at two time points; and a tag angle calculation section that calculates a tag angle between a straight line connecting an antenna and the wireless tag and a line on which the wireless tag is moving. The phase difference calculation section calculates two values of the phase difference. The tag angle calculation section calculates a first tag angle and a second tag angle. The tag reader comprises a tag distance calculation section that calculates an antenna-tag minimum distance as a minimum distance from the line to the antenna.

9 Claims, 16 Drawing Sheets

TAG READER CALCULATING MINIMUM DISTANCE BETWEEN ANTENNA AND TAG

CROSS REFERENCE TO RELATED APPLICATION

This application is based on Japanese Patent Application No. 2017-043150 filed on Mar. 7, 2017, Japanese Patent Application No. 2017-065440 filed on Mar. 29, 2017, the disclosures of which are incorporated herein by reference.

TECHNICAL FIELD

The present disclosure relates to a tag reader, and relates particularly to a technique of reading a wireless tag including a radio frequency identification (RFID) tag, affixed to an object moving on a line.

The present disclosure also relates to a tag reader, and relates particularly to a tag reader configured to determine whether a wireless tag is moving along a passage.

BACKGROUND ART

Patent Literature 1: JP 2012-98863 A
Patent Literature 2: JP 2006-72672 A
Patent Literature 1 discloses a technique of distinguishing whether a palette has passed on a conveyor or near the conveyor. The technique disclosed in Patent Literature 1 includes placing a reader-writer near the conveyor as well as disposing a fixed tag to face the reader-writer with the conveyor interposed therebetween. The palette moving on the conveyor also has a tag (hereinafter, a moving tag) affixed thereto.

When the moving tag is affixed to the palette moving on the conveyor, the moving tag is occasionally positioned between the fixed tag and the reader-writer facing each other with the conveyor interposed therebetween. The moving tag positioned between the fixed tag and the reader-writer inhibits communication between the fixed tag and the reader-writer. The moving tag is closer to the reader-writer than the fixed tag in this state and thus achieves excellent communication with the reader-writer.

The palette then moves on the conveyor and the moving tag affixed to the palette becomes no longer positioned between the fixed tag and the reader-writer, so that the fixed tag and the reader-writer achieve excellent communication. Meanwhile, the moving tag and the reader-writer become incommunicable.

The moving tag Is determined as being affixed to an object moving on the conveyor when such change is observed.

In contrast, the object having the moving tag affixed thereto and passing near the conveyor never inhibits communication between the fixed tag and the reader-writer. It is thus possible to distinguish whether the palette having the moving tag affixed thereto is passing on the conveyor or near the conveyor.

Patent Literature 2 discloses placing a fixed tag at each gate. The fixed tags are each positioned so as to be incommunicable from the other gates. The gates are each provided with a reader configured to communicate with the corresponding fixed tag. A moving tag is determined as being passing the gate when the corresponding reader is communicable with the moving tag and is incommunicable with the fixed tag.

SUMMARY

The technique disclosed in Patent Literature 1 requires the fixed tag. The fixed tag needs a space for placement, for example. In view thereof, the inventors of the present application have found that there is a demand for a technique of identifying an object moving on a set line like the conveyor without use of any fixed tag.

The technique disclosed in Patent Literature 2 requires the fixed tags. The fixed tags each need a space for placement, for example. In view thereof, the inventors of the present application have found that there is a demand for a technique of identifying a wireless tag moving along a set passage without use of any fixed tags.

It is an object of the present disclosure to provide a tag reader that identifies an object moving on a set line with no need for any fixed tag.

It is another object of the present disclosure to provide a tag reader that identifies a wireless tag moving along a set passage with no need for any fixed tag.

According to one aspect of the present disclosure, a tag reader communicating with a wireless tag includes: a phase calculation section that sequentially calculates a phase of a reception wave as an electric wave transmitted from the wireless tag and received by the tag reader in response to an electric wave transmitted to the wireless tag; a phase difference calculation section that calculates a phase difference as a difference of phases calculated at two time points by the phase calculation section; and a tag angle calculation section that calculates a tag angle as an angle between a straight line connecting an antenna included in the tag reader and the wireless tag and a line on which the wireless tag is moving, in accordance with the phase difference and a tag travel distance as a travel distance of the wireless tag during the two time points. The phase difference calculation section calculates two values of the phase difference with at least one of the two time points for calculation of the phase difference being set to a different time point. The tag angle calculation section calculates a first tag angle and a second tag angle each as the tag angle in accordance with the two values of the phase difference. The tag reader further includes a tag distance calculation section that calculates an antenna-tag minimum distance as a minimum distance from the line on which the wireless tag is moving to the antenna in accordance with a distance between a position at the tag angle having the first tag angle and a position at the tag angle having the second tag angle, the first tag angle, and the second tag angle.

According to the configuration of the present disclosure, it may be possible to identify an object moving on a set line with no need for any fixed tag.

According to another aspect of the present disclosure, a tag reader includes: a transmission antenna that transmits a search wave having a preset frequency to a passing determination area of a passage to be determined whether at least one wireless tag is moving on; a first reception antenna and a second reception antenna that are disposed to be distant from each other by one fourth of a wavelength of the search wave or less in a longitudinal direction of the passage so as to receive a response wave transmitted in response to the search wave from the wireless tag located in the passing determination area; a transmission control section that causes the transmission antenna to transmit the search wave at a first time point and then causes the transmission antenna to transmit the search wave at a second time point before the wireless tag has a travel distance reaching or exceeding one fourth of the wavelength of the search wave; a phase acquisition section that acquires phases of the response wave transmitted from the wireless tag in response to the search wave transmitted from the transmission antenna at the first time point and received by the first reception antenna and the second reception antenna, and phases of the response wave transmitted from the wireless tag in response to the search wave transmitted from the transmission antenna at the second time point and received by the first reception antenna and the second reception antenna; a phase correction section that corrects three out of four phases with a remaining one of the phases as a reference phase such that phase differences between the four phases acquired by the phase acquisition section are within a single period of the phase; a distance formula determination section that indicates, in four distance formulae including an identical number of phase periods having an unknown value, a distance between the wireless tag at the first time point and the first reception antenna, a distance between the wireless tag at the first time point and the second reception antenna, a distance between the wireless tag at the second time point and the first reception antenna, and a distance between the wireless tag at the second time point and the second reception antenna, in accordance with corrected phases obtained by correcting the phases by the phase correction section and the reference phase; a height calculation section that calculates a height of each of a first triangle and a second triangle, by substituting the four distance formulae determined by the distance formula determination section in a first triangle relational expression indicating a relation among three sides and the height of the first triangle defined by a position of the first reception antenna, a position of the second reception antenna, and a position of the wireless tag at the first time point and having a base between the first reception antenna and the second reception antenna and the height from the base to the position of the wireless tag, and in a second triangle relational expression indicating three sides and the height of the second triangle defined by the position of the first reception antenna, the position of the second reception antenna, and a position of the wireless tag at the second time point, and having a base between the first reception antenna and the second reception antenna and the height from the base to the position of the wireless tag; and a passage determination section that determines whether the wireless tag is moving along the passage assuming that the height calculated by the height calculation section is a minimum distance from the tag reader to a route along which the wireless tag is moving.

According to the configuration of the present disclosure, it may be possible to identify a wireless tag moving along a set passage with no need for any fixed tag.

BRIEF DESCRIPTION OF DRAWINGS

The above and other objects, features, and advantages of the present disclosure will become more apparent from the following detailed description with reference to the accompanying drawings. In the drawings.

DETAILED DESCRIPTION

Embodiments of the present disclosure will be described below with reference to the drawings.

First Embodiment (System Configuration)

Figure 1:
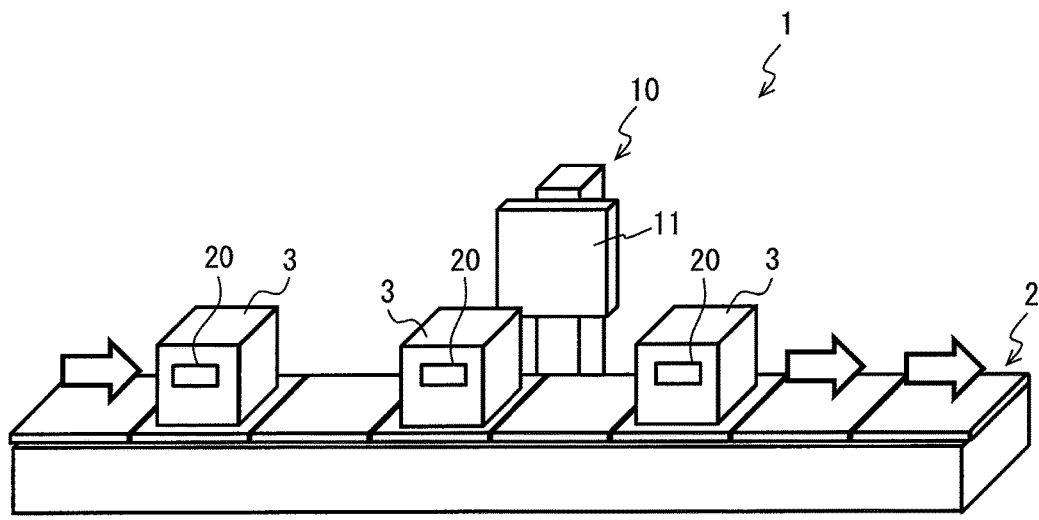
FIG. 1 is a diagram illustrating an explanatory view of a configuration of a wireless tag system according to a first embodiment.

FIG. 1 is an explanatory view depicting a configuration and an application mode of a wireless tag system 1 including a tag reader 10 according to the first embodiment of the present disclosure. The wireless tag system 1 includes the tag reader 10 placed adjacent to a conveyor belt line (hereinafter, simply called a line) 2, and a wireless tag 20 affixed to each cargo 3 moving on the line 2.

The tag reader 10 includes an antenna 11 and transmits, from the antenna 11 toward the line 2, a transmission wave as an electric wave for wireless tag reading. The transmission wave has any frequency legally authorized. The transmission wave according to the present embodiment has a frequency in the UHF (ultra high frequency such as 300 MHz to 3 GHz) band.

The wireless tag 20 is a passive tag configured to operate with electric power generated by reception of the transmission wave and transmit, to the tag reader 10, a response signal to the transmission wave in the form of an electric wave. The signal transmitted from the wireless tag 20 includes an ID for identification of the wireless tag 20.

The tag reader 10 receives the electric wave transmitted from the wireless tag 20. The electric wave transmitted from the wireless tag 20 and received by the tag reader 10 will hereinafter be called a reception wave.

Reception of the reception wave by the tag reader 10 indicates that the wireless tag 20 is located within a readable range of the tag reader 10. However, when the tag reader 10 has a large readable range, the tag reader 10 may read the wireless tag 20 affixed to the cargo 3 conveyed near the line 2 by a different transportation device such as a forklift truck.

This difficulty can be prevented by narrowing the readable range of the tag reader 10. Such decrease in readable range, however, shortens reading time and thus leads to deterioration in reading accuracy. In view of this, the tag reader 10 according to the present embodiment has a readable range not significantly decreased and determines whether the wireless tag 20 is moving on the line 2.

Figure 2:
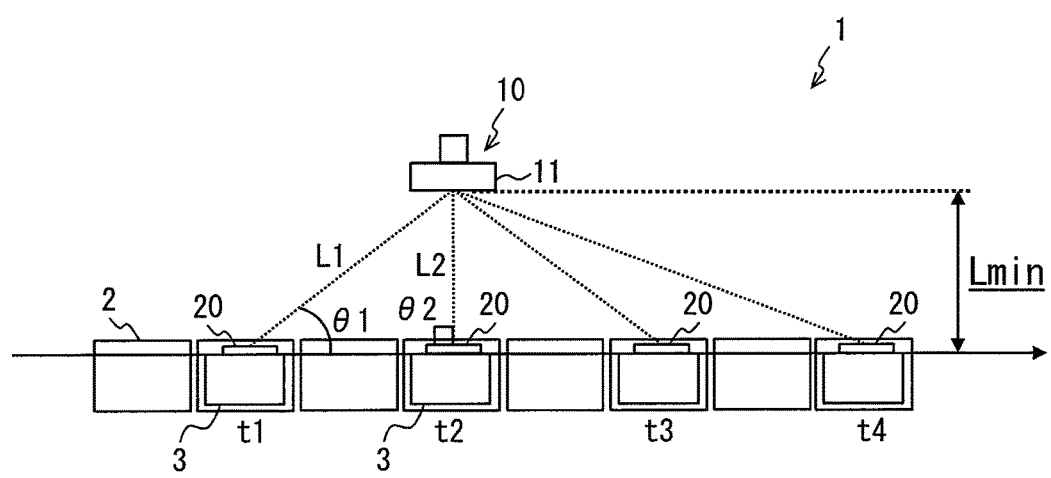
FIG. 2 is a top view of the wireless tag system.

FIG. 2 is a top view of the wireless tag system 1 depicted in FIG. 1. As depicted in FIG. 2, the line 2 is linear. Unlike FIG. 1, FIG. 2 depicts the wireless tag 20 affixed to a side surface towards the tag reader 10, of the cargo 3. FIG. 2 depicts the single cargo 3 moving to the right in the figure as time elapses.

(Configuration of Tag Reader 10)

Figure 3:
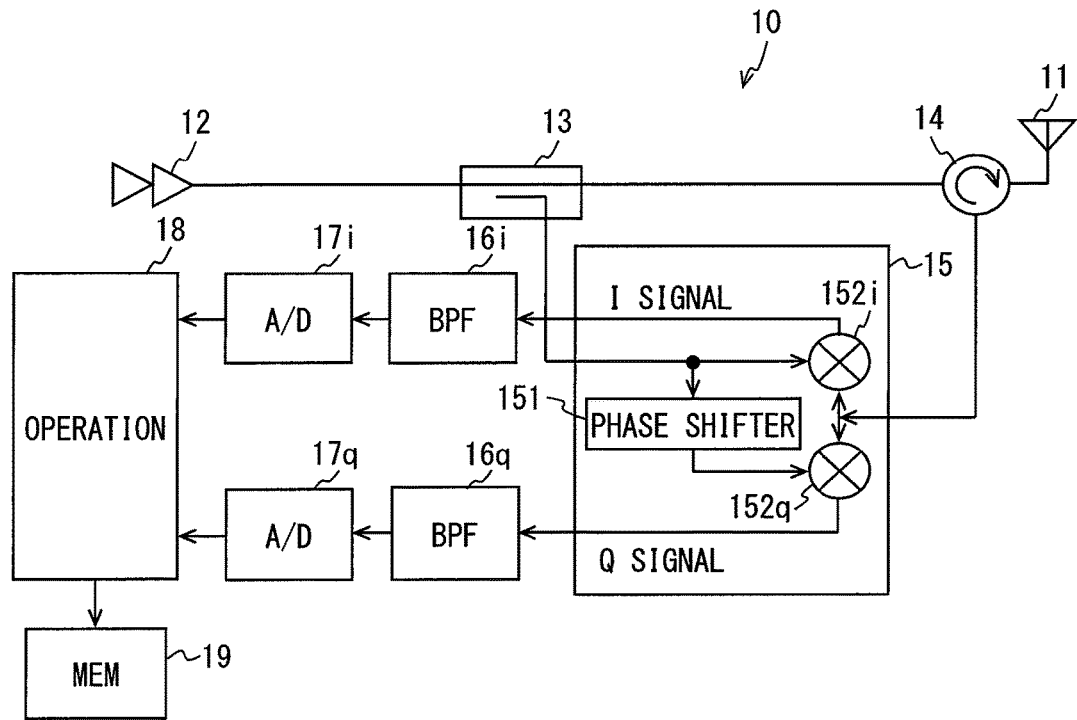
FIG. 3 is a block diagram depicting a configuration of a tag reader.

FIG. 3 is a configuration diagram of the tag reader 10. The tag reader 10 includes the function of an operation portion 18. The tag reader 10 includes, in addition to the antenna 11, a transmitter 12, a coupler 13, an antenna duplexer 14, a quadrature demodulator 15, bandpass filters 16$i$ and 16$q$, AD converters 17$i$ and 17$q$, and the operation portion 18.

The transmitter 12 generates a transmission signal indicating the transmission wave to be transmitted to the wireless tag 20, and outputs the transmission signal. The signal is branched by the coupler 13 and transmitted to the antenna duplexer 14 and the quadrature demodulator 15. The antenna duplexer 14 outputs, to the antenna 11, the signal from the transmitter 12, and outputs, to the quadrature demodulator 15, a reception signal indicating the reception wave received by the antenna 11. The antenna 11 radiates the transmission wave in the air and receives the electric wave from the wireless tag 20.

The quadrature demodulator 15 receives the reception wave received by the antenna 11. The quadrature demodulator 15 includes a phase shifter 151 and two mixers 152$i$ and 152$q$. The phase shifter 151 receives the signal indicating the transmission wave branched by the coupler 13. The first mixer 152$i$ receives the reception signal and the transmission signal. The first mixer 152$i$ mixes the reception signal and the transmission signal to obtain an I signal Including an in-phase component of a baseband signal. The second mixer 152$q$ receives the reception signal and a signal obtained by quadrature phase shift of the transmission signal with use of the phase shifter 151. The second mixer 152$q$ obtains a Q signal including a quadrature component of the baseband signal.

The signal obtained by the first mixer 152$i$ is inputted to the operation portion 18 via the bandpass filter 16$i$ and the AD converter 171. The signal obtained by the second mixer 152$q$ is inputted to the operation portion 18 via the bandpass filter 16$q$ and the AD converter 17$q$. The bandpass filters 16$i$ and 16$q$ are configured to selectively pass a signal component having no time phase $\omega t$. The time phase $\omega t$ will be described with reference to expression 2.

Figure 7:
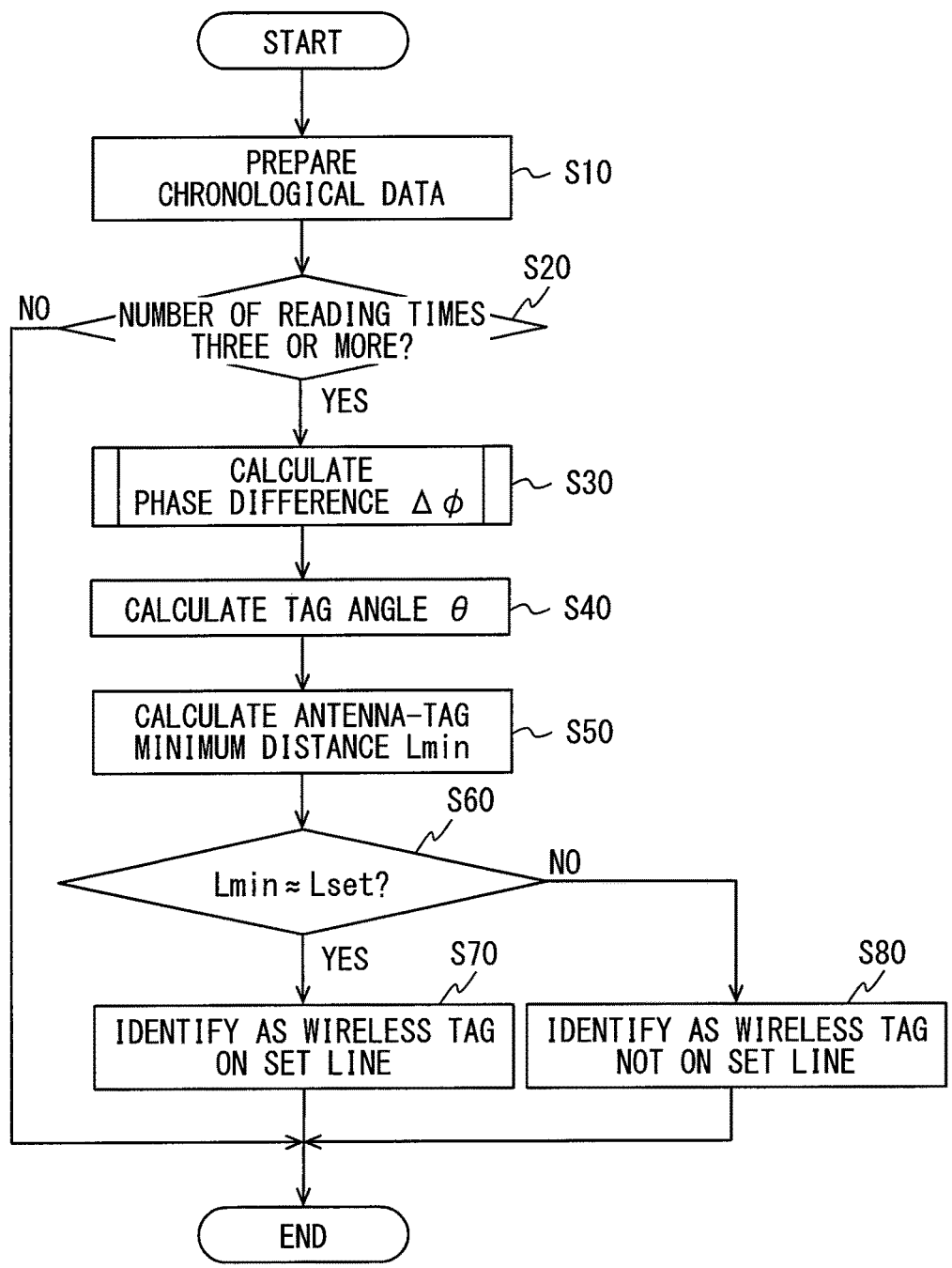
FIG. 7 is a flowchart illustrating processing executed by an operation portion.

The operation portion 18 is configured by a computer including a CPU, a ROM, a RAM, and the like, and executes the processing depicted in flowcharts of FIG. 7 and the subsequent figures with the CPU executing a program stored in a storage medium like the ROM with use of a temporary storage function of the RAM. Execution of the processing depicted in FIG. 7 and the subsequent figures relates to execution of a method associated with the program. The ROM and the RAM are examples of a computer readable non-transitory storage medium. Functional blocks of the operation portion 18 can partially or entirely be achieved with use of a single or multiple ICs or the like (in other words, as hardware). Functions of the operation portion 18 can partially or entirely be achieved through the combination of execution of software by the CPU and a hardware member.

The operation portion 18 calculates the minimum distance from the antenna 11 to the wireless tag 20 in accordance with a phase $\phi_r$ of the reception wave, assuming that the wireless tag 20 moves on the line 2. The distance will hereinafter be called an antenna-tag minimum distance Lmin.

A nonvolatile memory 19 corresponds to a storage portion according to the present disclosure, and stores the minimum distance between the antenna 11 and the line 2 beforehand. The minimum distance between the antenna 11 and the line 2 will hereinafter be called an antenna-line distance Lset. The antenna-line distance Lset corresponds to a length of a perpendicular line from the antenna 11 to the line 2. The antenna-line distance Lset can be stored correspondingly to a single line 2 or correspondingly to each of multiple lines 2.

The nonvolatile memory 19 also stores moving speed of the line 2. The wireless tag 20 affixed to the cargo 3 moving on the line 2 also moves at the moving speed of the line 2. In other words, the nonvolatile memory 19 stores travel speed $V_{tag}$ of the wireless tag 20.

(Relation Between Phase $\phi_r$ of Reception Wave and Propagation Distance)

The operation portion 18 operates on the basis of the fact that the phase $\phi_r$ of the reception wave is determined in accordance with a propagation distance but not in accordance with time. The fact that the phase $\phi_r$ of the reception wave is determined in accordance with the propagation distance will thus be described initially.

An electromagnetic wave has a wave function indicated by expression 1.

Expression 1
$$\psi = Ae^{j(\omega t - \beta L)}$$
$$\beta = \frac{2\pi}{\lambda}$$
$$\omega = 2\pi f$$
$$\lambda = c/f$$

The symbol A is an amplitude (W), the symbol $\lambda$ is wavelength (m), and the symbol L is a propagation distance (m).

According to the expression 1, the electromagnetic wave has a phase $\phi$ indicated by the expression 2.

$$\phi:[rad]=\omega t-\beta L \quad\quad \text{Expression 2}$$

The symbol $\beta$ is a phase constant (rad/m), and the symbol $\omega$ is an angular frequency (rad/s).

The expression 2 Includes phases, namely, the time phase $\omega t$ and a space phase $\beta L$. The phase $\phi_r$ of the reception wave in expression 3 is indicated only with the space phase 13L with no reference to the time phase $\omega t$. This is because reception time $t_r$ is substantially equal to transmission time $t_t$. The expression 3 includes a sign $\phi t$ denoting a phase of the transmission wave, and any expression other than the expression 3 includes $\phi_t$ Indicating the phase $\phi_r$ of the reception wave at a time point t.

Expression 3

$$\phi_r - \phi_t = \omega(t_r - t_t) - \beta L \approx -\beta L$$
$$\because t_r \approx t_t$$

The symbol $\phi_r$ is a phase (rad) of a reception wave, the symbol $\phi_t$ is a phase (rad) of a transmission wave, the symbol $t_r$ is a reception time (s), and the symbol $t_t$ is a transmission time (s).

(Description of Tag Angle Calculation Expression)

Figure 4:
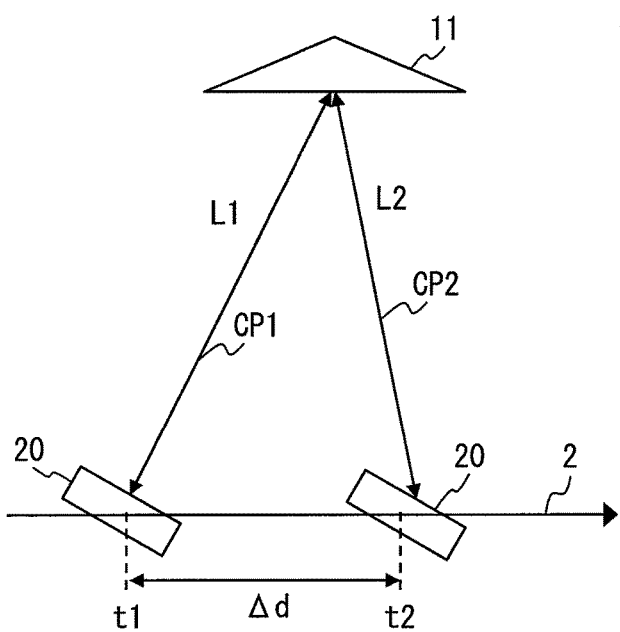
FIG. 4 is a view conceptually illustrating communication paths at time points t1 and t2.

Expression for calculation of a tag angle θ is derived from the expression 3. How to derive the expression for calculation of the tag angle θ will be described next. FIG. 4 conceptually depicts a communication path CP1 at a time point t1 and a communication path CP2 at a time point t2. The wireless tag 20 moves to the right in the figure on the line 2. A distance between the antenna 11 and the wireless tag 20 will be called an antenna-tag distance L, assuming that the antenna-tag distance L at the time point t1 has a value L1 and the antenna-tag distance L at the time point t2 has a value L2. The antenna-tag distance L can alternatively be expressed as a half (or one way) of the propagation distance of the reception wave.

Figure 5:
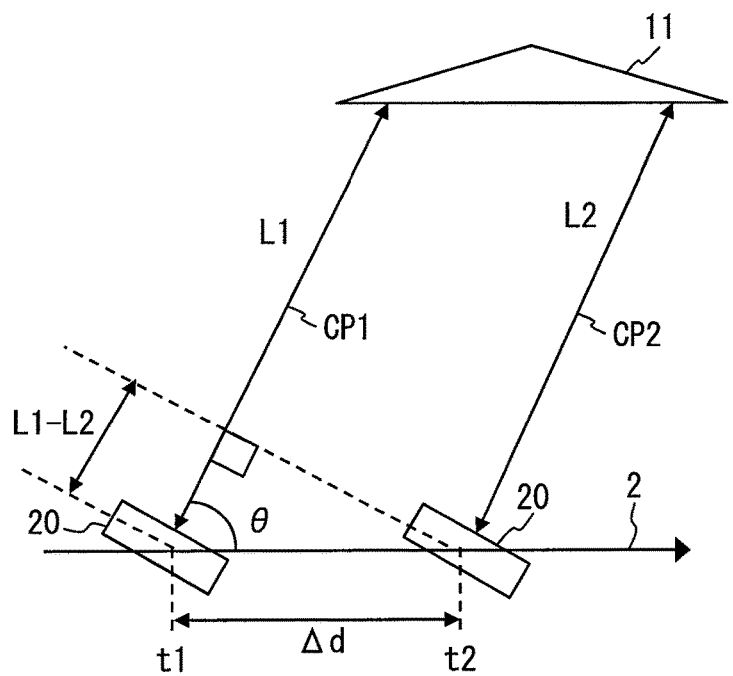
FIG. 5 is a view of a geometric shape approximated when a tag travel distance is short.

The wireless tag 20 has a travel distance during the time point t1 and the time point t2, which will be called a tag travel distance Δd. In a case where the tag travel distance Δd is sufficiently small with respect to the values L1 and L2, in other words, where the time point t1 and the time point t2 have short time therebetween, the communication path CP1 and the communication path CP2 can be regarded as being parallel to each other as depicted in FIG. 5. When the communication path CP1 and the communication path CP2 can be regarded as being parallel to each other, the wireless tag 20 moving during the two time points t1 and t2 has a travel locus configuring an oblique side of a right angled triangle having the tag angle θ as one of interior angles as depicted in FIG. 5. When the tag angle θ is determined, the right angled triangle has the remaining angle determined accordingly and thus has a determined shape.

Expression 4 indicates a geometrical relation among the tag angle θ, the length Δd of the oblique side, and a length of an adjacent side (L1−L2) according to the right angled triangle.

$$\Delta d \cos\theta = L1 - L2 \quad \text{Expression 4}$$

Expression 5 is obtained by multiplying the both members of the expression 4 by a phase constant β.

Expression 5

$$\phi_{\Delta d}\cos\theta = \frac{\phi_{t1} - \phi_{t2}}{2}$$

Expression 6 indicating the tag angle θ is obtained by deforming the expression 5.

Expression 6

$$\theta = \cos^{-1}\left[\frac{(\phi_{t1} - \phi_{t2})}{2\phi_{\Delta d}}\right]$$

Expression 7 indicates a denominator of the right member in the expression 6.

Expression 7

$$2\phi_{\Delta d} = 2\beta\Delta d = \frac{4\pi}{\lambda}\Delta d = \frac{4\pi f}{c}\Delta d = \frac{4\pi f}{c}v_{tag}\cdot\Delta t$$

According to the expression 6 and the expression 7, the tag angle θ can be calculated from a time difference Δt between the two time points t1 and t2, phases $\phi_{t1}$ and $\phi_{t2}$ at the two time points, and the tag travel speed $V_{tag}$. Accordingly, a single tag angle θ can be calculated from phases φ measured at two time points.

(Calculation of Antenna-Tag Minimum Distance Lmin)

Figure 6:
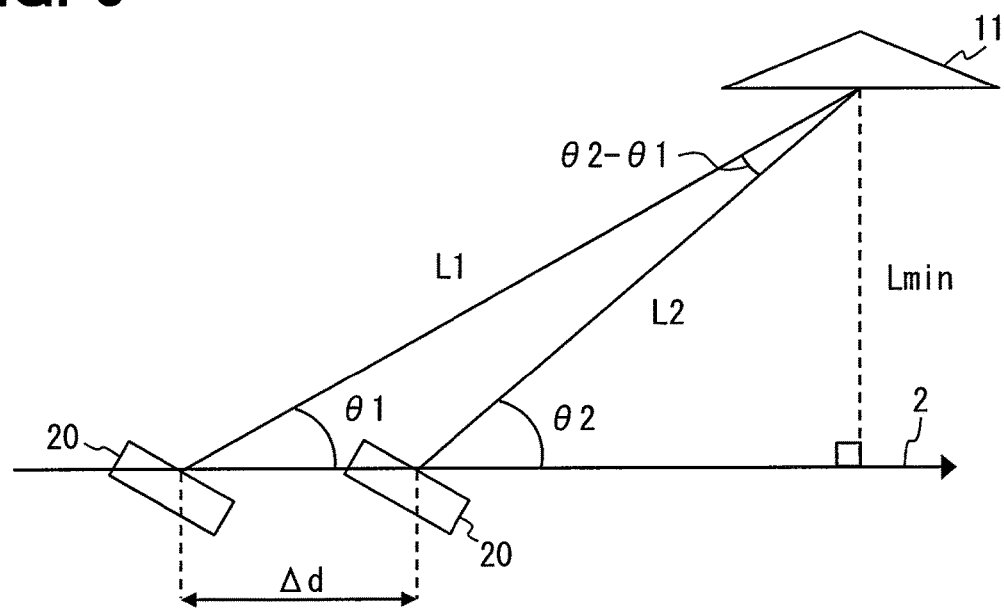
FIG. 6 is a diagram illustrating an explanatory view of a method of calculating an antenna-tag minimum distance.

The single tag angle θ can be calculated from phases φ measured at two time points, so that two tag angles θ will be obtained from phases φ measured at three time points. FIG. 6 depicts a geometrical relation between two tag angles θ1 and θ2 and the antenna-tag minimum distance Lmin.

Expression 8 is obtained by applying triangulation expression to two right angled triangles depicted in FIG. 6. The expression 8 indicates that the antenna-tag minimum distance Lmin can be calculated from the two tag angles θ1 and θ2 and the tag travel distance Δd.

The tag travel distance Δd can be calculated from the travel speed $V_{tag}$ of the wireless tag 20 and the time difference Δt between the two time points. When the travel speed $V_{tag}$ of the wireless tag 20 is known, in other words, when the speed of the line 2 is known, the antenna-tag minimum distance Lmin can be calculated from the tag angles θ1 and θ2 measured at two time points.

Expression 8

$$Lmin = \frac{\Delta d}{\left(\frac{1}{\tan\theta 1}\right) + \left(\frac{1}{\tan(\pi - \theta 2)}\right)}$$
$$= \frac{\sin\theta 1 \sin(\pi - \theta 2)}{\sin(\theta 1 + (\pi - \theta 2))}\Delta d$$

(Processing by Operation Portion 18)

The operation portion 18 calculates the antenna-tag minimum distance Lmin to identify whether the wireless tag 20 is moving on the preset line 2. The processing executed by the operation portion 18 for identification of whether the wireless tag 20 is moving on the preset line 2 will be described next with reference to the flowchart of FIG. 7.

The operation portion 18 executes the processing depicted in FIG. 7 every time a reception wave is received or every time a certain number of reception waves are received. In order to determine reception of the reception wave, it is determined whether a reception wave having amplitude of at least a certain size is received in accordance with the I signal received from the AD converter 171 and the Q signal received from the AD converter 17q.

There is prepared chronological data of the phase $\phi_r$ of the reception wave in S10. The chronological data associates the phase $\phi_r$ of the reception wave with reception time of the reception wave. In a case where the chronological data of the phase $\phi_r$ of the reception wave has already been prepared, the prepared chronological data is updated in S10.

The phase $\phi_r$ of the reception wave is calculated in accordance with expression 9. The processing in S10 is executed by a phase calculation section according to the present disclosure.

Expression 9

$$\phi_r = \tan^{-1}\left(\frac{A_Q}{A_I}\right)$$

Deriving the expression 9 will be described with reference to a series of equations in expression 10.

Expression 10

$$\psi_t = A_1 e^{j(\omega t)} \quad (10\text{-}1)$$

$$\psi_r = A_2 e^{j(\omega t - \phi_r)} \quad (10\text{-}2)$$

$$\psi_t \psi_r^* = A_1 A_2 e^{j(\phi_r)} = A_1 A_2 (\cos\phi_r + j\sin\phi_r) \quad (10\text{-}3)$$

$$I(\psi_t \psi_r^*) = A_1 A_2 (\cos\phi_r) \quad (10\text{-}4)$$

$$Q(\psi_t \psi_r^*) = A_1 A_2 (\sin\phi_r) \quad (10\text{-}5)$$

$$\frac{Q(\psi_t \psi_r^*)}{I(\psi_t \psi_r^*)} = \frac{\sin\phi_r}{\cos\phi_r} = \tan\phi_r \quad (10\text{-}6)$$

$$\tan^{-1}\left(\frac{Q(\psi_t \psi_r^*)}{I(\psi_t \psi_r^*)}\right) = \phi_r \quad (10\text{-}7)$$

$$Q(\psi_t \psi_r^*) = A_Q \quad (10\text{-}8)$$

$$I(\psi_t \psi_r^*) = A_I \quad (10\text{-}9)$$

$$\phi_r = \tan^{-1}\left(\frac{A_Q}{A_I}\right) \quad (10\text{-}10)$$

According to the expression 1, the transmission wave has a wave function indicated by expression 10-1, and the reception wave has a wave function indicated by expression 10-2. Expression 10-3 is obtained by multiplying complex conjugates of the expression 10-1 and the expression 10-2. Expression 10-4 and expression 10-5 indicate an I signal component and a Q signal component of the expression 10-3, respectively. Expression 10-6 is obtained by dividing the expression 10-5 by the expression 10-4. Expression 10-7 is obtained by multiplying the both members of the expression 10-6 by $\tan^{-1}$. Expression 10-8 and expression 10-9 are established because the tag reader 10 mixes the transmission wave and the reception wave with use of the mixers 152$i$ and 152$q$ to obtain the I signal and the Q signal. Expression 10-10, that is, the expression 9, is obtained by substituting the expression 10-8 and the expression 10-9 in the expression 10-7.

The chronological data of the phase $\phi_r$ of the reception wave is prepared or updated by associating the phase Or of the reception wave calculated in accordance with the expression 9 with the reception time of the reception wave. The chronological data is then stored in the RAM or the like in the operation portion 18.

Whether the number of reading times is three or more is determined in S20. The number of reading times corresponds to the number of time points included in the chronological data. If NO in the determination in S20, the processing depicted in FIG. 7 ends. If YES in the determination in S20, the flow proceeds to S30.

A phase difference $\Delta\phi_n$ is calculated in S30. The processing in S30 is executed by a phase difference calculation section according to the present disclosure. The phase $\phi_r$ of the reception wave is indicated by a tangent as in the expression 9, and thus has 180-degree periodicity. The phase difference $\Delta\phi$n cannot be calculated correctly by simply subtracting the phase $\phi_r$ of the reception wave obtained at a former time point from the phase $\phi_r$ of the reception wave obtained at a latter time point. The processing including phase difference period correction depicted in FIG. 8 is accordingly executed to calculate the phase difference $\Delta\phi_n$.

Figure 8:
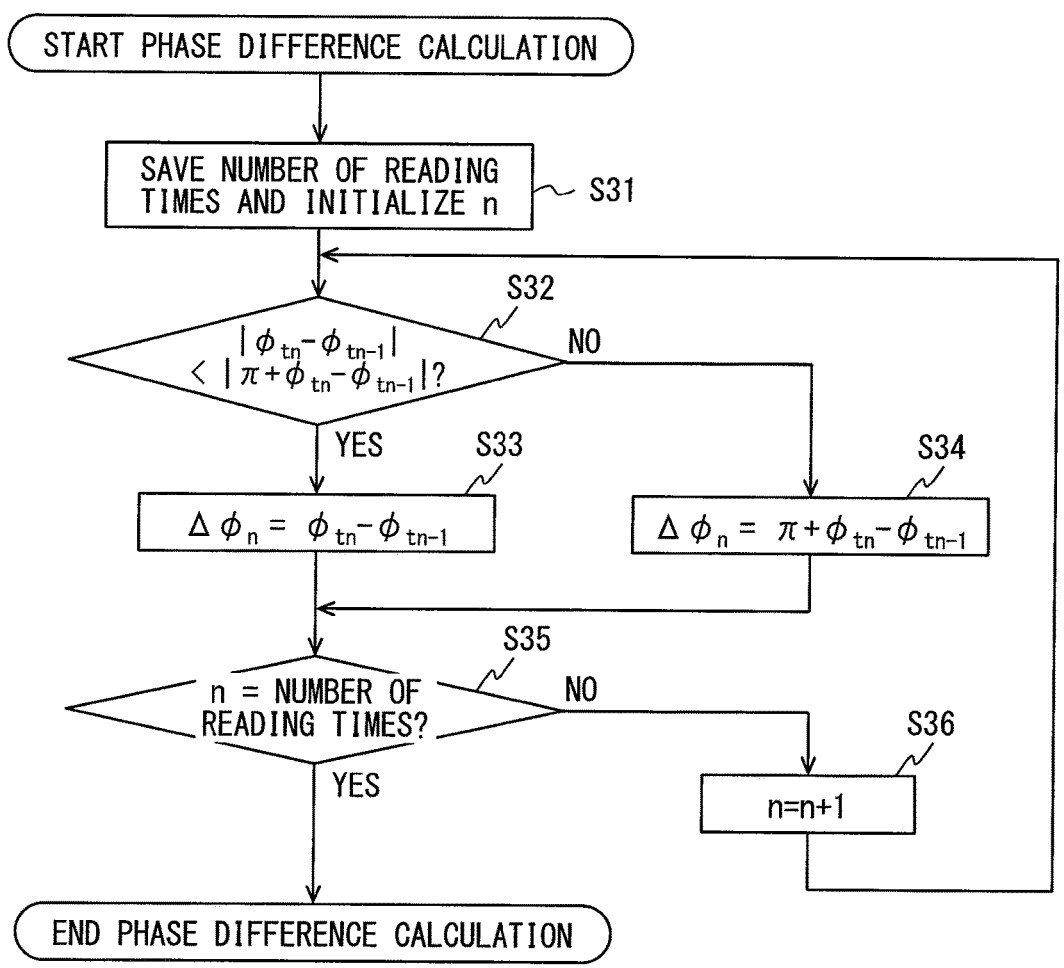
FIG. 8 is a flowchart of detailed processing in S30 of FIG. 7.

In S31 in FIG. 8, the number of reading times is stored and the value n is initialized. Subsequently in S32, it is determined whether $|\phi_{tn}-\phi_{tn-1}|<|\pi+\phi_{tn}-\phi_{tn-1}|$ is established. This determination relates to whether the phase $\phi$ has the value $\pi$ during change from the phase $\phi_{tn-1}$ at a former reading time point tn−1 to the phase $\phi_{tn}$ at a latter time point tn.

If YES in the determination in S32, the flow proceeds to S33. In S33, the value $\phi_{tn}-\phi_{tn-1}$ is calculated as the phase difference $\Delta\phi_n$. If NO in the determination in S32, the flow proceeds to S34. In S34, the phase difference $\Delta\phi_n$ is obtained by subtracting the phase $\phi_{tn-1}$ at the former time point tn−1 from a value obtained by adding $\pi$ to the phase $\phi_{tn}$ at the latter time point tn. The processing from S32 to S34 is called phase period correction.

The flow proceeds to S35 after the processing in S33 or S34 is executed. Whether the number of reading times has reached n is determined in S35. If NO in this determination, the flow proceeds to S36. One is added to n in S36. The flow then returns to S32. If YES in the determination in S35, phase difference calculation depicted in FIG. 8 ends and the flow returns to the processing in FIG. 7. The processing in S30 is executed if the number of reading times is three or more in the determination in S20. There are thus calculated at least two phase differences $\Delta\phi_n$. In a case where the processing depicted in FIG. 8 is executed repeatedly, the phase difference $\Delta\phi_n$ may not be calculated at the reading times when the phase difference $\Delta\phi_n$ is already calculated.

The description will refer again to FIG. 7. The tag angle $\theta$ is calculated in S40. The processing in S40 is executed by a tag angle calculation section according to the present disclosure. The tag angle $\theta$ is calculated in accordance with the tag angle calculation formula indicated in expression 11. The expression 11 is obtained by replacing the numerator of the expression 6 with $\Delta\phi$ and the denominator thereof with the expression 7. The value $\Delta\phi$ in the expression 11 indicates the phase difference $\Delta\phi$ calculated in S30. The time difference $\Delta t$ corresponding to the phase difference $\Delta\phi$ is substituted for $\Delta t$ in the expression 11. The nonvolatile memory 19 stores the travel speed $V_{tag}$ of the wireless tag 20. The processing in S40 is executed if YES in S20, and there are thus calculated two or more tag angles $\theta$.

Expression 11

$$\theta = \cos^{-1}\left(\frac{\Delta\phi}{\frac{2\pi f}{c} v_{tag} \cdot \Delta t}\right)$$

Subsequently in S50, the antenna-tag minimum distance Lmin is calculated in accordance with the expression 8 from a combination of two tag angles $\theta$ measured at consecutive time points out of the two or more tag angles $\theta$ calculated in S40. The tag travel distance $\Delta d$ to be substituted in the expression 8 is calculated from the travel speed $V_{tag}$ of the wireless tag 20 stored in the nonvolatile memory 19 and the time difference $\Delta t$ between the two time points. The processing in S50 is executed by a tag distance calculation section according to the present disclosure. Out of the tag angles $\theta$ calculated in S40, the tag angle $\theta$ to be substituted for $\theta 1$ in the expression 8 will be called a first tag angle $\theta 1$ and the tag angle θ to be substituted for θ2 in the expression 8 will be called a second tag angle θ2.

If there are multiple combinations of the two tag angles θ measured at consecutive time points, the antenna-tag minimum distance Lmin is calculated for each of the combinations and an average value of the antenna-tag minimum distances Lmin will be set as an eventual antenna-tag minimum distance Lmin.

In S60, it is determined whether the antenna-tag minimum distance Lmin calculated in S50 is substantially equal to the antenna-line distance Lset. This determination relates to whether an error as a difference between the antenna-line distance Lset and the antenna-tag minimum distance Lmin is at most an allowable error. The allowable error can be set appropriately. The allowable error exemplarily has a length obtained by adding a half wavelength to the width of the line 2. The allowable error alternatively has a length obtained by adding $\lambda/4$ to the width of the line 2. The length relevant to a wavelength $\lambda$ is added to the width of the line 2 because a length calculated from a phase is not distinguishable from a distance different by a length obtained by integral multiplication of the wavelength $\lambda$. Not the length obtained by multiplying the wavelength $\lambda$ by one but a half of the wavelength $\lambda$ is added because the reception wave is generated from the transmission wave and thus has an error on each of an outward way and a homeward way. Adding a further halved length or one fourth of the wavelength $\lambda$ also covers that the phase $\phi_r$ of the reception wave is indicated by a tangent, in other words, the reception wave does not have a $\lambda$ period for a single wavelength but a $\lambda/2$ period for a half wavelength.

The flow proceeds to S70 if YES in the determination in S60, and the wireless tag 20 having received the reception wave is regarded as being moving on the set line 2. The flow proceeds to S80 if NO in the determination in S60, and the wireless tag 20 having received the reception wave is regarded as being moving off the set line 2. The processing in S60, S70, and S80 is executed by a line determination section according to the present disclosure.

As described with reference to the expression 3, the first embodiment is based on the fact that the phase $\phi_r$ of the reception wave is determined in accordance with the antenna-tag distance L and not in accordance with time t, and the wireless tag 20 moves on the line 2.

When the wireless tag 20 moves on the line 2, the tag angle calculation formula of the expression 11 is obtained from the geometrical relation depicted in FIG. 5 during the short time between the two time points t1 and t2 while the direction from the wireless tag 20 to the tag reader 10 is regarded as being kept constant.

The tag angle calculation formula indicates that a single tag angle θ is obtained when a single phase difference Δφ is obtained. As depicted in FIG. 6, the antenna-tag minimum distance Lmin is calculated when there are obtained two tag angles θ.

Two phase differences Δφ are necessary to obtain two tag angles θ. The phase $\phi_r$ of the reception wave is calculated three or more times in the present embodiment, in order to obtain the two phase differences Δφ (S10 and S20). The antenna-tag minimum distance Lmin is calculated in accordance with the expression 8 when the two or more tag angles θ are obtained (S50).

Whether the antenna-tag minimum distance Lmin Is substantially equal to the beforehand stored antenna-line distance Lset is determined in order to determine whether the wireless tag 20 is moving on the set line 2.

Whether the wireless tag 20 and the cargo having the wireless tag 20 affixed thereto are moving on the line 2 is determined in this manner, requiring no fixed tag.

Furthermore, when the antenna-tag minimum distance Lmin is calculated sequentially for each of wireless tags 20, it is possible to find out whether the wireless tags 20 are moving on a single line 2 or on different lines 2. The above embodiment thus enables distinction among the multiple lines 2 with no need for any fixed tag.

In the above embodiment, the antenna-tag minimum distance Lmin and the antenna-line distance Lset are compared with each other to determine whether the wireless tag 20 is moving on the set line 2. There is, however, no need to store the antenna-line distance Lset for determination of whether one of the wireless tags 20 is moving on the line 2 on which the remaining plural wireless tags 20 are moving.

Second Embodiment

The second embodiment will be described next. In the description of the second and third embodiments, constituent elements denoted by reference signs identical to those already mentioned are regarded as being identical to the constituent elements denoted by those reference signs in the former embodiment(s) unless otherwise specified. When only part of a configuration is described, the remaining part of the configuration can correspond to that described in the foregoing embodiment(s).

Figure 9:
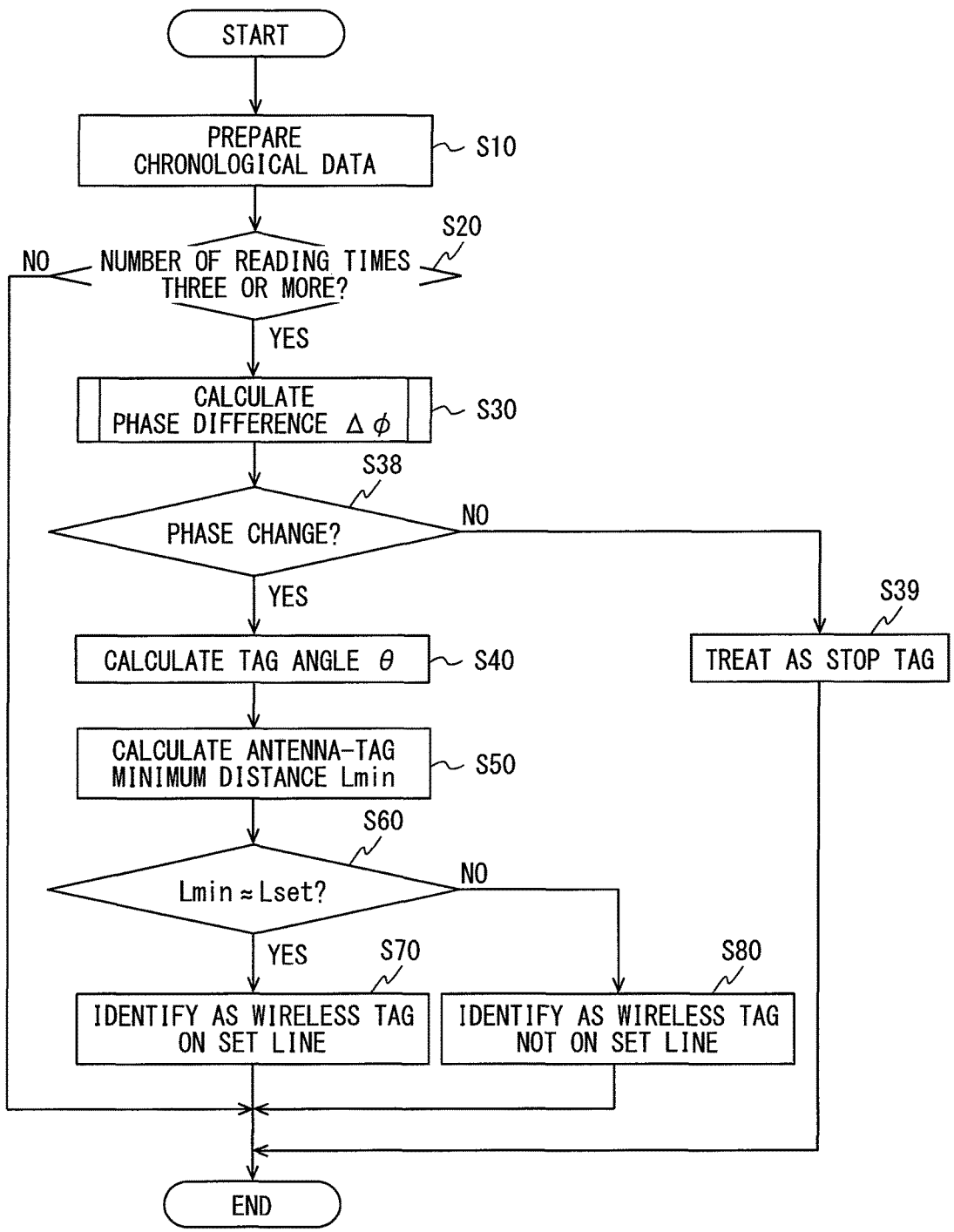
FIG. 9 is a flowchart of processing executed by an operation portion according to a second embodiment.

The operation portion 18 according to the second embodiment executes the processing depicted not in FIG. 7 but in FIG. 9. The processing depicted in FIG. 9 further includes, in addition to the processing in FIG. 7, the processing in S38 and S39. The processing in S38 and S39 Is executed by a stop determination section according to the present disclosure.

In the flow depicted in FIG. 9, the phase difference Δφ is executed in S30 and the processing in S38 is executed subsequently. S38 relates to determination of whether there is phase change. It is determined that there is no phase change when the phase difference Δφ calculated in S30 is substantially zero. When there Is no phase change, NO is determined in S38 and the flow proceeds to S39.

The wireless tag 20 is regarded as not being moving when there is no phase change. The wireless tag 20 is thus treated as a stopped tag in S39. The flow depicted in FIG. 9 ends when the processing in S39 is executed.

The second embodiment achieves determination of whether the wireless tag 20 is moving on the set line 2 as well as determination of whether the wireless tag 20 is stopped.

Third Embodiment

The third embodiment will be described next. The antenna-line distance Lset and the travel speed $V_{tag}$ of the wireless tag 20 are known in the first and second embodiments. In the third embodiment, the antenna-line distance Lset is known but the travel speed $V_{tag}$ of the wireless tag 20 is unknown. The third embodiment also includes calculation of the travel speed $V_{tag}$ of the wireless tag 20.

Figure 10:
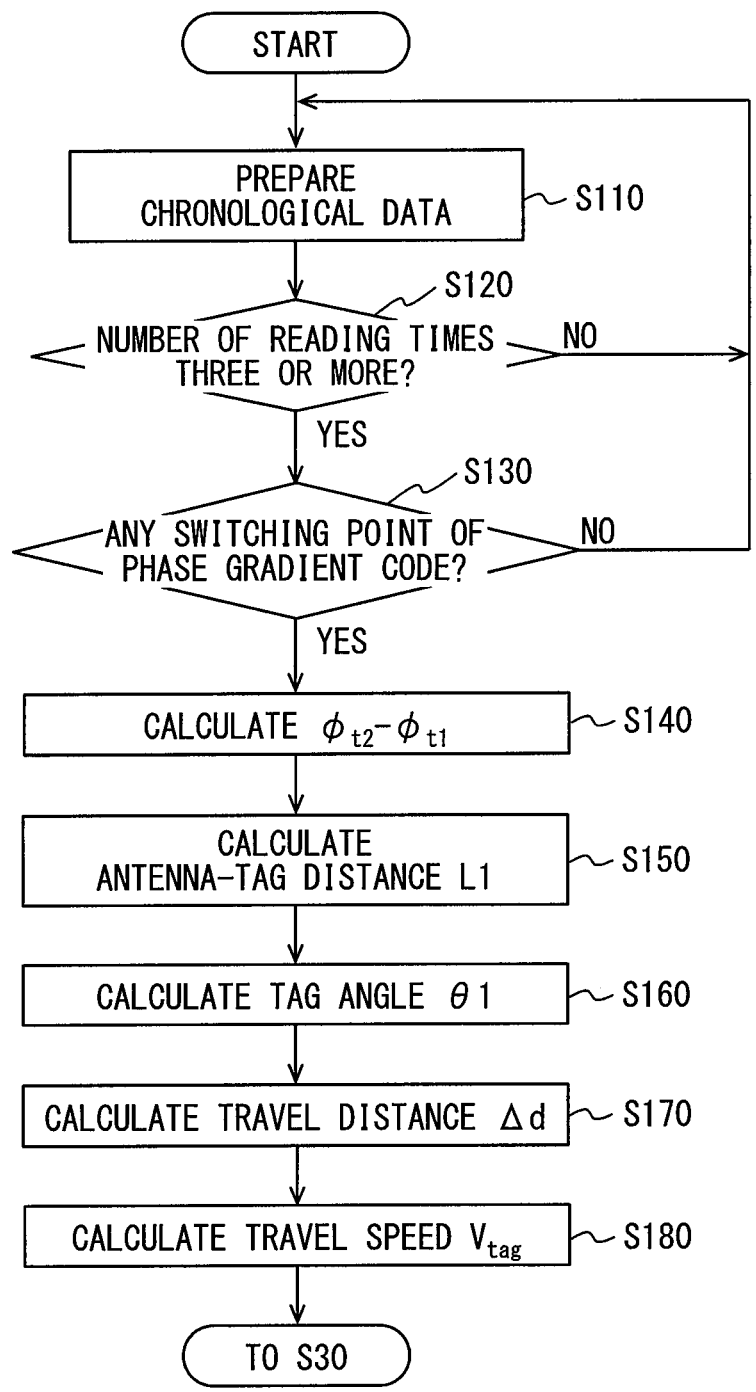
FIG. 10 is a flowchart of processing executed by an operation portion according to a third embodiment.

The operation portion 18 according to the third embodiment executes the processing depicted in FIG. 10 when the travel speed $V_{tag}$ of the wireless tag 20 is unknown.

The processing depicted in FIG. 10 is executed under the same conditions as those of the processing depicted in FIG. 7. The processing in S110 in FIG. 10 is identical to the processing in S10 in FIG. 7, and includes preparation of chronological data of the phase $\phi_r$ of the reception wave. The processing in S110 is also executed by the phase calculation section.

The processing in subsequent S120 is identical to the processing in S20 in FIG. 7, and includes determination of whether the number of reading times is three or more. The flow returns to S110 if NO in the determination in S120, whereas the flow proceeds to S130 if YES in the determination.

Whether there is a switching point of a phase gradient code is determined in S130. The phase gradient code indicates a code of a value obtained by subtracting, from the latest one of the phases $\phi_{tn}$ calculated sequentially in S110, the phase $\phi_{tn-1}$ at the second latest time point.

As described earlier, the phase $\phi_r$ of the reception wave is determined by the antenna-tag distance L. The phase gradient code thus has the switching point when a size correlation of the antenna-tag distances L at two time points is inverted. The size correlation between the antenna-tag distances L at former and latter time points is inverted when the wireless tag 20 is positioned right in front of the antenna 11. The switching point of the phase gradient code indicates a position with the tag angle $\theta$ equal to 90 degrees.

If YES in the determination in S130, in other words, if it is determined that the phase gradient code has had the switching point, the flow proceeds to S140. If NO in the determination of S130, the flow returns to S110.

The processing in S140 to be executed by a second phase difference calculation section according to the present disclosure includes calculating a phase difference ($\phi_{t2}-\phi_{t1}$) assuming that the phase immediately before the determination that the phase gradient code has the switching point has the value $\phi_{t2}$ and the phase $\phi_{t1}$ is calculated immediately before the phase $\phi_{t2}$. In this case, the time point t1 corresponds to a code switching adjacent time point according to the present disclosure.

The phases at these time points can be replaced with the phase $\phi$ calculated immediately after the determination that the phase gradient code has the switching point, and the phase $\phi$ calculated subsequently. In this case, the latter time point corresponds to the code switching adjacent time point according to the present disclosure. The tag angle can be regarded as having 90 degrees immediately before or after the determination that the phase gradient code has the switching point.

The flow proceeds to S150 after the processing in S140 is executed. In S150, the antenna-tag distance L1 at the time point t1 is calculated in accordance with expression 12. The processing in S150 is executed by a second tag distance calculation section according to the present disclosure. The expression 12 includes the value L2 indicating the antenna-line distance. The expression 12 also includes a preset phase constant $\beta$. FIG. 2 depicts the tag angles $\theta 1$ and $\theta 2$ as well as the antenna-tag distances L1 and L2 In this case.

Expression 12

$$L1 = L2 + \frac{(\phi_{t1} - \phi_{t2})}{2\beta}$$

The expression 12 is obtained by establishing the expression 3 at the two time points t1 and t2, executing subtraction between the left members and subtraction between the right members of the two established equations, and then deforming the obtained equation.

The processing in S160 to be executed by a second tag angle calculation section according to the present disclosure Includes substituting the antenna-line distance having the value L2 and the antenna-tag distance L1 calculated in S150 in expression 13 to calculate the tag angle $\theta 1$. The expression 13 is obtained by deforming expression obtained by applying the sine theorem to the right angled triangle depicted in FIG. 2.

Expression 13

$$\theta 1 = \sin^{-1}\frac{L2}{L1}$$

The processing in S170 to be executed by a travel distance calculation section according to the present disclosure Includes substituting, in expression 14, the tag angle $\theta 1$ calculated in S160, the antenna-tag distance L1 calculated in S150, and the antenna-line distance having the value L2, to calculate the tag travel distance $\Delta d$.

Expression 14

$$\Delta d = \frac{L1 - L2}{\cos\theta 1}$$

The processing in S180 to be executed by a speed calculation section according to the present disclosure includes substituting the tag travel distance $\Delta d$ calculated in S170 and the time difference between the time points t1 and t2 in expression 15 to calculate the travel speed $V_{tag}$ of the wireless tag 20.

Expression 15

$$v_{tag} = \frac{\Delta d}{(t2 - t1)}$$

The flow proceeds to S30 in FIG. 7 or FIG. 9 after the travel speed $V_{tag}$ of the wireless tag 20 is calculated in this manner. The travel speed $V_{tag}$ of the wireless tag 20 is calculated and the number of reading times is also determined as three or more at this time point. Accordingly, the processing in S10 and S20 is not executed and the flow proceeds to S30.

The processing in S40 executed in the second embodiment includes calculating the denominator in the expression 11 by multiplying the travel speed $V_{tag}$ calculated in S180 by the time difference $\Delta t$ between the two time points to obtain the tag travel distance $\Delta d$ of the wireless tag 20. In S50 as in S40, the tag travel distance $\Delta d$ is calculated by multiplying the travel speed $V_{tag}$ calculated in S180 by the time difference $\Delta t$ between the two time points.

The wireless tag 20 having inversion of the phase gradient code is positioned to have the antenna-tag distance L having the minimum value, which is equal to the antenna-line distance Lset. The nonvolatile memory 19 stores the antenna-line distance Lset. The antenna-tag distance L can thus be determined as being equal to the antenna-line distance Lset at the phase switching point.

The antenna-tag distance L1 can be calculated from the antenna-tag distance L2 and the phase difference ($\phi_{t1}-\phi_{t2}$) as indicated by the expression 12 before and after the switching point of the phase gradient code. The antenna-tag distance L1 is thus calculated in S150.

If the antenna-tag distance L1 at the time point t1 is known and the antenna-tag distance L2 at the switching point of the phase gradient code is found to be equal to the antenna-line distance Lset, the tag travel distance Δd from the position of the wireless tag 20 at the time point t1 to the position of the wireless tag 20 at the switching point of the phase gradient code can be calculated from these values in accordance with the expression 13 and the expression 14 (S160 and S170).

When the tag travel distance Δd between the position of the wireless tag 20 at the time point t1 and position at the switching point of the phase gradient code and the time difference (t2−t1) are known, the travel speed $V_{tag}$ of the wireless tag 20 can be calculated in accordance with the expression 15 in S180.

The travel speed $V_{tag}$ of the wireless tag 20 can be calculated in this manner, so that whether the wireless tag 20 is moving on the set line 2 can be determined as in the first embodiment even when the travel speed $V_{tag}$ of the wireless tag 20 is unknown.

The embodiments of the present disclosure are described above, although the present disclosure is not limited to the embodiments but the following modification examples are to be included in the technical scope of the present disclosure. The present disclosure is also applicable with various modifications, in addition to the followings, made within the scope not departing from the purpose thereof.

First Modification Example

Each of the embodiments described above achieves sequential calculation of the tag angle θ. The wireless tag 20 is determined as being passing right in front of the tag reader 10 when the tag angle has 90 degrees. Passing determination can thus alternatively be made in accordance with the tag angle θ.

The antenna-tag distance L has the minimum value when the wireless tag 20 passes right in front of the tag reader 10. Passing determination can thus still alternatively be made in accordance with the determination of whether the antenna-tag distance has the minimum value.

Fourth Embodiment (Exemplary Use State)

Figure 11:
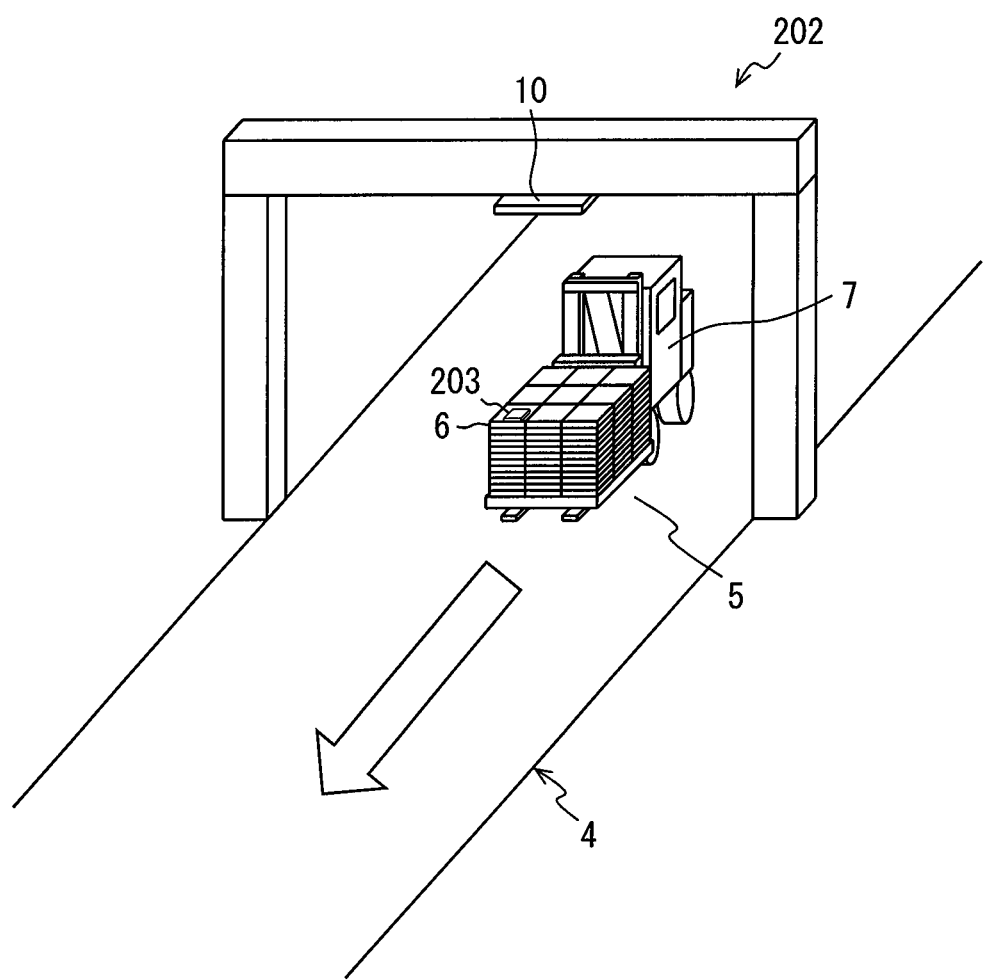
FIG. 11 is a diagram illustrating a use state of a tag reader according to a fourth embodiment.

FIG. 11 depicts a use state of the tag reader 10 according to the fourth embodiment of the present disclosure. FIG. 11 exemplifies the use state where the tag reader 10 is placed at an upper portion of a gate 202 and determines whether a wireless tag 203 is moving along a passage 4. The passage 4 is linear in the portion adjacent to the gate 202.

FIG. 11 exemplifies the state where the wireless tag 203 is affixed to a packing box 6 that is delivered by a forklift truck 7. The wireless tag 203 is affixed only to the single packing box 6 for convenience of depiction. The wireless tag 203 is actually affixed to each packing box 6 that needs to be managed.

The wireless tag 203 can alternatively be affixed to an article other than the packing box 6. The article having the wireless tag 203 affixed thereto can still alternatively be delivered by a conveying device other than the forklift truck 7, such as a conveyor belt line.

The tag reader 10 transmits, to an area below the gate of the passage 4, a search wave as an electric wave used for search of the wireless tag 203. The search wave has a frequency legally authorized. The search wave according to the present embodiment has a frequency in the UHF band, more specifically, in a 920 MHz band as the ISM (industry science medical) band.

The wireless tag 203 is a passive tag configured to operate with electric power generated by reception of the search wave and transmit, to the tag reader 10, a response signal to the search wave in the form of an electric wave. The signal transmitted from the wireless tag 203 includes an ID for identification of the wireless tag 203. The electric wave transmitted from the wireless tag 203 will hereinafter be called a response wave.

The tag reader 10 transmits the search wave at each of two different time points of the first time point t1 and the second time point t2, and receives the response wave. The tag reader 10 subsequently calculates distances L1 and L2 between the wireless tag 203 and first and second antennas 2011 and 2012 from phases of the response waves, and further calculates, from the distances L1 and L2, the minimum distance Lmin between the tag reader 10 and the wireless tag 203 on a travel route of the wireless tag 203. Whether the travel route of the wireless tag 203 matches the passage 4 is determined in accordance with the minimum distance Lmin. The distances L1 and L2 according to the fourth to sixth embodiments and their modification examples will be described as follows. A distance $L1_{t1}$ indicates a distance from the wireless tag 203 at the first time point t1 to the first antenna 2011. A distance $L2_{t1}$ indicates a distance from the wireless tag 203 at the first time point t1 to the second antenna 2012. A distance $L1_{t2}$ indicates a distance from the wireless tag 203 at the second time point t2 to the first antenna 2011.

(Configuration of Tag Reader 10)

Figure 12:
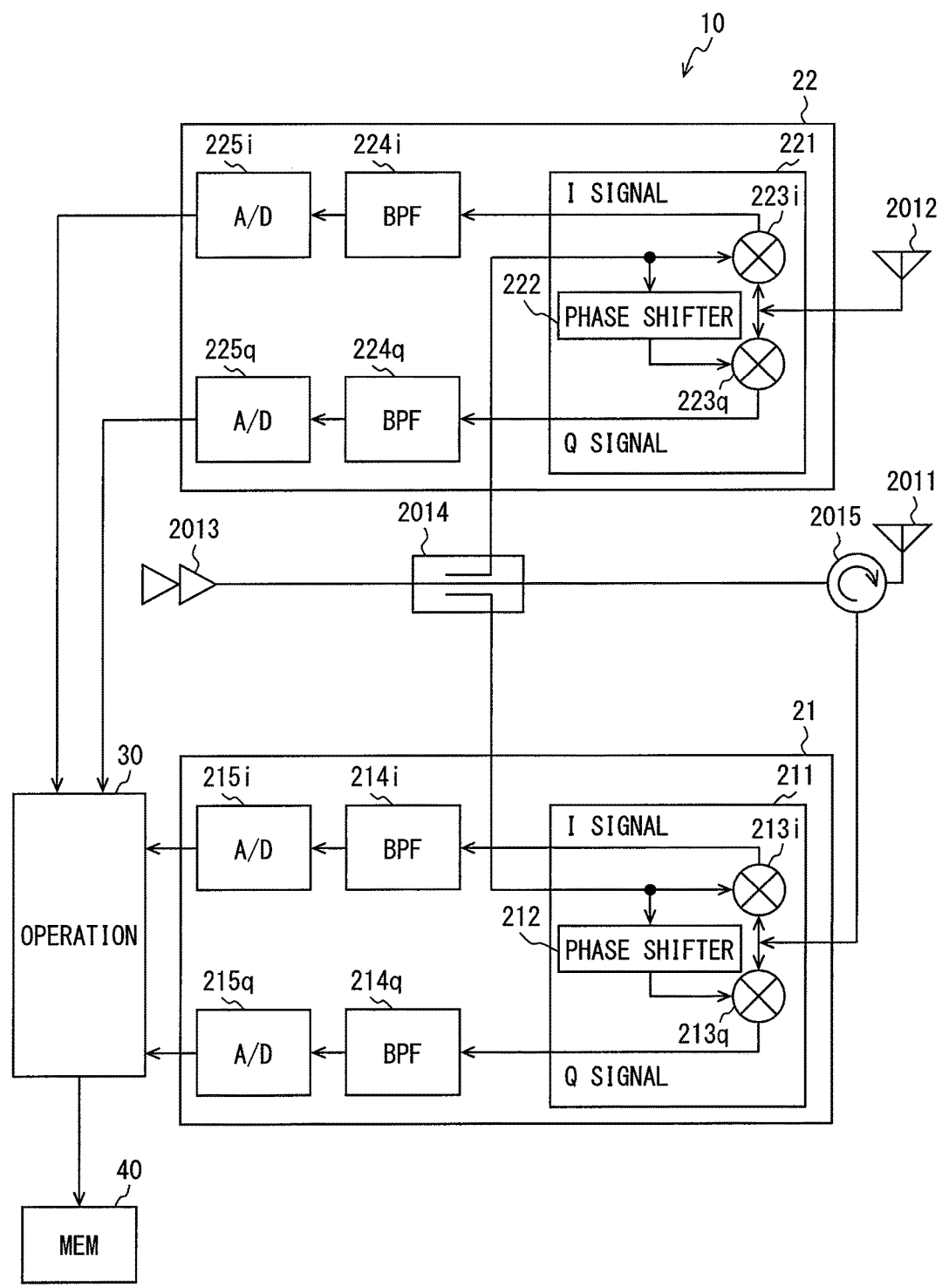
FIG. 12 is a block diagram of a configuration of the tag reader.

FIG. 12 is a configuration diagram of the tag reader 10. The tag reader 10 includes the first antenna 2011, the second antenna 2012, a transmitter 2013, a coupler 2014, an antenna duplexer 2015, a first receiver 21, a second receiver 22, an operation portion 30, and a nonvolatile memory 40.

The first antenna 2011 transmits the search wave and receives the response wave transmitted from the wireless tag 203 in response to the search wave. The first antenna 2011 corresponds to a first reception antenna according to the present disclosure. The first antenna 2011 forms a communicable area including both ends of a passing determination point 5 in the longitudinal direction of the passage 4. The communicable area allows the first antenna 2011 to communicate with the wireless tag 203. The tag reader 10 communicates with the wireless tag 203 to determine whether the wireless tag 203 is moving along the passage 4. The communicable area can thus alternatively be called a passing determination area.

The second antenna 2012 is configured to receive a response wave and is not configured to transmit a search wave. The second antenna 2012 is disposed in the longitudinal direction of the passage 4 with respect to the first antenna 2011. The second antenna 2012 corresponds to a second reception antenna according to the present disclosure. The first antenna 2011 and the second antenna 2012 are away from each other by a distance of one fourth or less of a wavelength of the search wave. A reason therefor will be described later. Both the first antenna 2011 and the second antenna 2012 are disposed at the center in the width direction of the passage 4.

The transmitter 2013 generates a search signal indicating the search wave and outputs the search signal. The signal is branched by the coupler 2014. The search signal is branched by the coupler 2014 to be transmitted to the antenna duplexer 2015, a quadrature demodulator 211 of the first receiver 21, and a quadrature demodulator 221 of the second receiver 22.

The antenna duplexer 2015 outputs, to the first antenna 2011, the signal from the transmitter 2013, and outputs, to the quadrature demodulator 211, a response signal indicating the response wave received by the first antenna 2011. The first antenna 2011 radiates the search wave in the air and receives the response wave from the wireless tag 203.

The quadrature demodulator 211 receives the response wave received by the first antenna 2011. The quadrature demodulator 211 includes a phase shifter 212 and two mixers 213*i* and 213*q*. The phase shifter 212 receives the search signal branched by the coupler 2014. The first mixer 213*i* receives the response signal and the search signal. The first mixer 213*i* mixes the response signal and the search signal to obtain an I signal including an in-phase component of a baseband signal. The second mixer 213*q* receives the response signal and a signal obtained by quadrature phase shift of the search signal with use of the phase shifter 212. The second mixer 213*q* obtains a Q signal including a quadrature component of the baseband signal.

The signal obtained by the first mixer 213*i* is inputted to the operation portion 30 via the bandpass filter 2141 and the AD converter 2151, whereas the signal obtained by the second mixer 213*q* is inputted to the operation portion 30 via the bandpass filter 214*q* and the AD converter 215*q*. The bandpass filters 214*i* and 214*q* are configured to selectively pass a signal component having no time phase ωt.

The second receiver 22 is connected to the second antenna 2012, and is supplied with the response signal indicating the response wave received by the second antenna 2012. The second receiver 22 is configured identically with the first receiver 21. The second receiver 22 includes the quadrature demodulator 221, bandpass filters 224*i* and 224*q*, and AD converters 2251 and 225*q*. These constituent elements are configured Identically with the quadrature demodulator 211, the bandpass filters 214*i* and 214*q*, and the AD converters 215*i* and 215*q* included in the first receiver 21. The quadrature demodulator 221 includes a phase shifter 222 and two mixers 223*i* and 223*q*. These constituent elements are configured identically with the phase shifter 212 and the mixers 213*i* and 213*q* of the quadrature demodulator 211 included in the first receiver 21.

Figure 13:
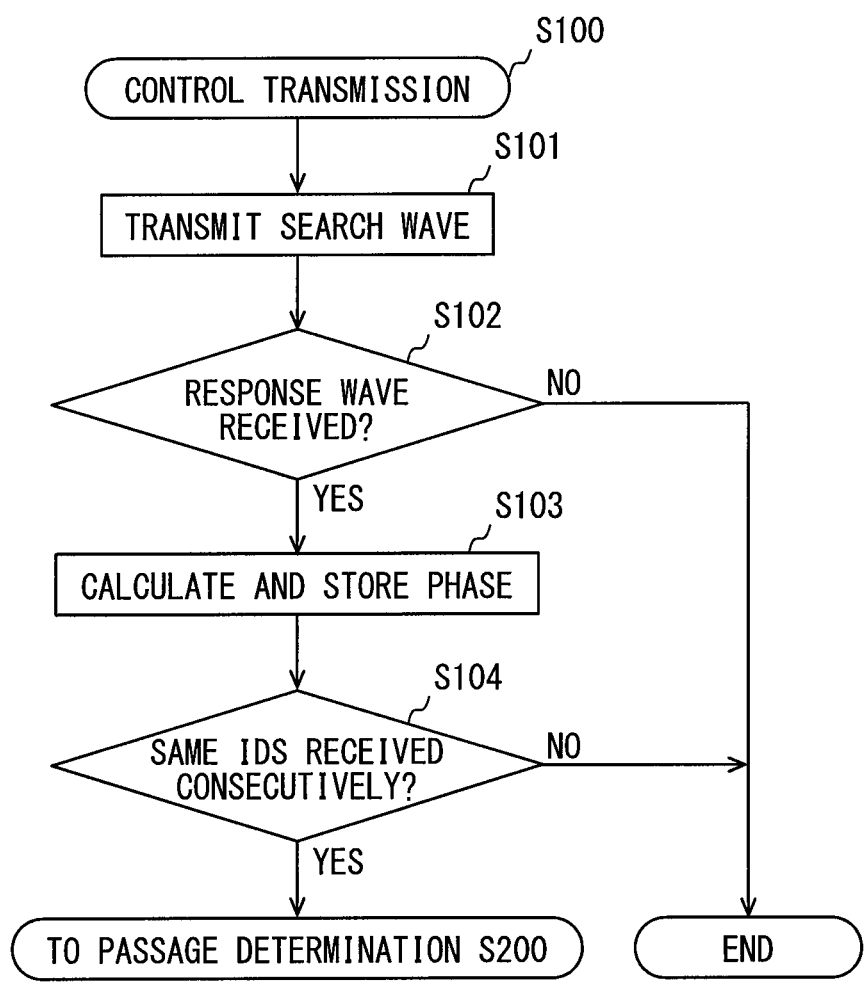
FIG. 13 is a flowchart of transmission control executed by an operation portion.
Figure 14:
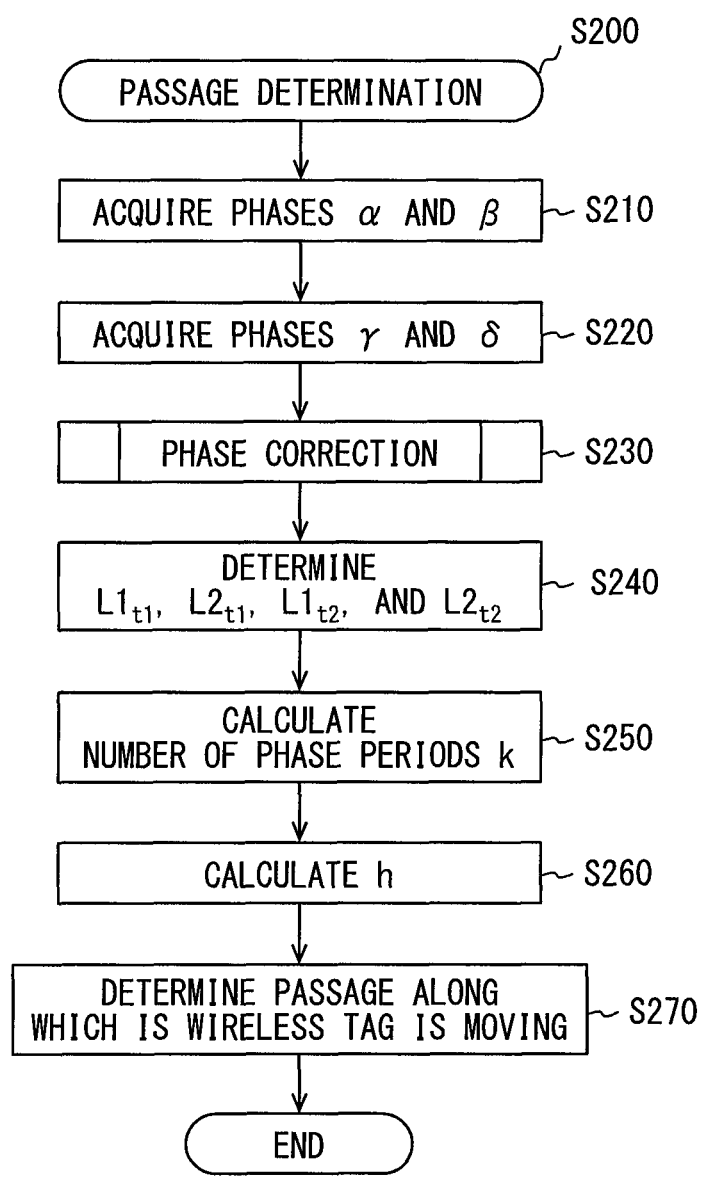
FIG. 14 is a flowchart of passage determination executed by the operation portion.

The operation portion 30 is configured by a computer including a CPU, a ROM, a RAM, and the like, and executes the processing depicted in flowcharts of FIG. 13 and FIG. 14 with the CPU executing a program stored in a recording medium like the ROM with use of a temporary storage function of the RAM. Execution of the processing depicted in these flowcharts relates to execution of a method associated with the program. The ROM and the RAM are examples of a computer readable non-transitory storage medium. Functional blocks of the operation portion 30 can partially or entirely be achieved with use of a single or multiple ICs or the like (in other words, as hardware). Functions of the operation portion 30 can partially or entirely be achieved through the combination of execution of software by the CPU and a hardware member.

The nonvolatile memory 40 stores the minimum distance Lmin from the tag reader 10 to the passage 4. In a case where the communicable area of the tag reader 10 includes multiple passages 4, the nonvolatile memory 40 stores the minimum distance Lmin for each of the passages 4.

(Processing by Operation Portion 30)

The operation portion 30 periodically transmits the search wave. Transmission has a period shorter than time necessary for a travel distance of the wireless tag 203 to become one fourth or more of the wavelength. When the frequency in the 920 MHz band is adopted, one fourth of the wavelength corresponds to about 8 cm. The wireless tag 203 has unknown travel speed. The transmission period is thus determined in accordance with estimated travel speed of the wireless tag 203 to be detected.

Assume an exemplary case where the transmission period has 0.03 s. Travel by 8 cm in 0.03 s requires speed of 9.6 (km/h) obtained by calculating 8 (cm)×3600 (s)/0.03 (s). In consideration of moving speed of the conveyor belt line or travel speed of the forklift truck, the transmission period of about 0.03 s will adequately be shorter than the time necessary for the travel distance of the wireless tag 203 to become one fourth or more of the wavelength even when the travel distance of the wireless tag 203 is unknown.

The operation portion 30 executes transmission control in S100 depicted in FIG. 13 in each transmission period. The processing depicted in FIG. 13 includes the processing executed by a transmission control section according to the present disclosure.

The search wave is transmitted in S101. Whether the response wave is received is determined in S102. Whether the response wave is received is determined in accordance with whether predetermined information like the ID is acquired by decoding the response signal. The processing in FIG. 13 ends if NO in the determination in S102, whereas the flow proceeds to S103 If YES in the determination.

In S103, the phase of the response wave is determined, and the phase thus determined is stored in a predetermined storage portion such as the RAM included in the operation portion 30. The phase of the response wave is determined in accordance with expression 16 and a quadrant determined by codes of the I signal and the Q signal. The expression 16 includes $A_Q$ denoting an amplitude of the Q signal and $A_I$ denoting an amplitude of the I signal. The expression 16 is calculated from a wave function of a reception wave.

Expression 16

$$\phi = \tan^{-1}\left(\frac{A_Q}{A_I}\right)$$

Each of the first antenna 2011 and the second antenna 2012 is expected to receive the response wave. The phases of both the response wave received by the first antenna 2011 and the response wave received by the second antenna 2012 are calculated.

In S104, whether the response waves are consecutively received from the wireless tag 203 having an identical ID. The processing in FIG. 13 ends if NO in this determination, and whereas passage determination in S200 depicted in FIG. 14 is executed if YES in the determination.

(Outline of Passage Determination in S200)

Figure 15:
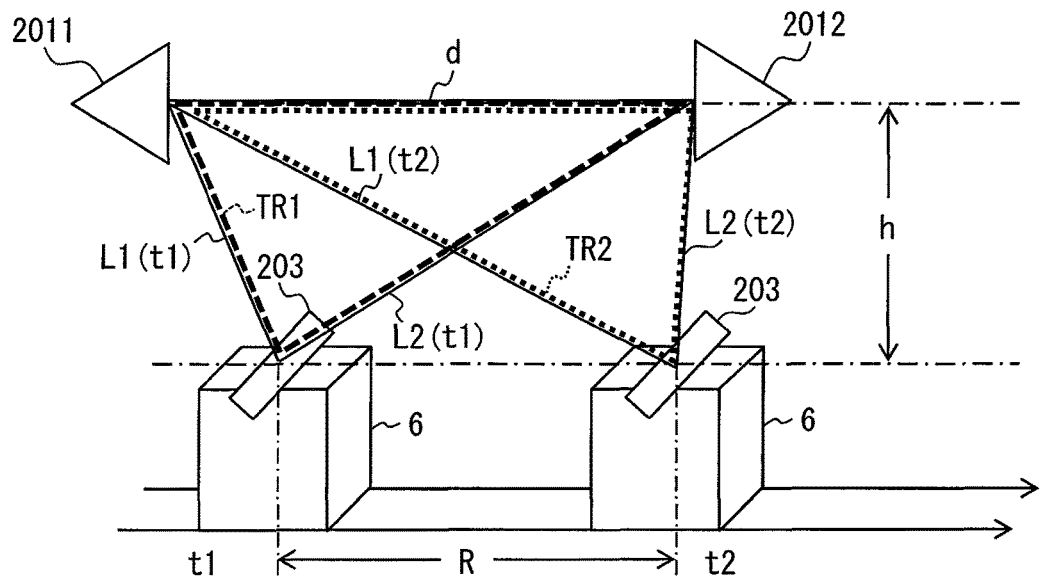
FIG. 15 is an explanatory view of an outline of the passage determination.
Figure 16:
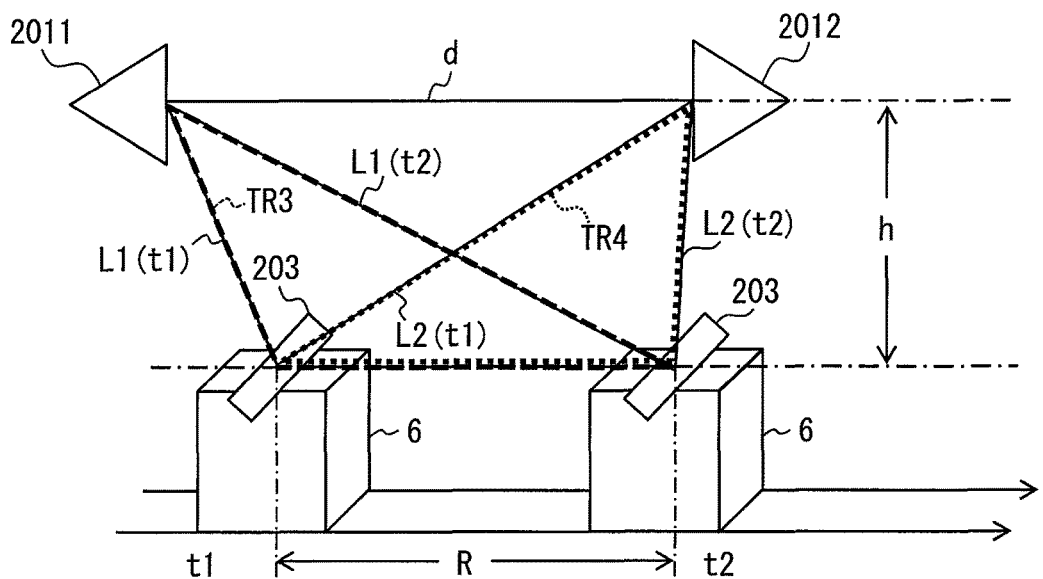
FIG. 16 is an explanatory view of the outline of the passage determination.

The passage determination will be summarized with reference to FIG. 15 and FIG. 16 before the processing in each step in FIG. 14 is described. In the following description, assume that the search wave corresponding to a formerly received one of the response waves determined as being received consecutively in S104 in FIG. 13 is transmitted at the first time point t1. Furthermore, assume that the search wave corresponding to the subsequently received response wave is transmitted at the second time point t2.

The wireless tag 203 is assumed to be positioned as depicted in FIG. 15 at each of the first time point t1 and the second time point t2. A distance $L1_{t1}$ indicates a distance from the wireless tag 203 at the first time point t1 to the first antenna 2011. A distance $L2_{t1}$ indicates a distance from the wireless tag 203 at the first time point t1 to the second antenna 2012. A distance $L1_{t2}$ indicates a distance from the wireless tag 203 at the second time point t2 to the first antenna 2011. A distance $L2_{t2}$ indicates a distance from the wireless tag 203 at the second time point t2 to the second antenna 2012. A distance d indicates the distance from the first antenna 2011 to the second antenna 2012.

Assume that a first triangle TR1 is shaped by the distance $L1_{t1}$, the distance $L2_{t1}$, and the distance d, and a second triangle TR2 is shaped by the distance $L1_{t2}$, the distance $L2_{t2}$, and the distance d. The distance $L1_{t1}$, the distance $L2_{t1}$, the distance $L1_{t2}$, and the distance $L2_{t2}$ are indicated by expression 17 to expression 20, respectively.

$$L1_{t1}=2k\pi+\alpha \qquad \text{Expression 17}$$

$$L2_{t1}=2m\pi+\beta \qquad \text{Expression 18}$$

$$L1_{t2}=2n\pi+\gamma \qquad \text{Expression 19}$$

$$L2_{t2}=2p\pi+\delta \qquad \text{Expression 20}$$

The expression 17 to the expression 20 include $\alpha$, $\beta$, $\gamma$, and $\delta$ each indicating a phase. The response wave received by the first antenna 2011 at the first time point t1 has the phase $\alpha$, and the response wave received by the second antenna 2012 at the first time point t1 has the phase $\beta$. The response wave received by the first antenna 2011 at the second time point t2 has the phase $\gamma$, and the response wave received by the second antenna 2012 at the second time point t2 has the phase $\delta$. The expression 17 to the expression 20 also include k, m, n, and p each indicating the number of phase periods. The number of phase periods corresponds to the number of waves within each distance L.

The first triangle TR1 and the second triangle TR2 have an identical height h. The height h of the first triangle TR1 is indicated by expression 21 whereas the height h of the second triangle TR2 is indicated by expression 22.

Expression 21
$$h=\frac{\sqrt{(2L1_{t1}L2_{t1})^2-(L1_{t1}^2+L2_{t1}^2-d^2)^2}}{2d}$$

Expression 22
$$h=\frac{\sqrt{(2L1_{t2}L2_{t2})^2-(L1_{t2}^2+L2_{t2}^2-d^2)^2}}{2d}$$

The expression 21 indicates a relation among the three sides and the height of the first triangle TR1 having the base of the distance d between the first antenna 2011 and the second antenna 2012 and the height h from the base to the wireless tag 203. The expression 21 corresponds to a first triangle relational expression according to the present disclosure. The expression 22 indicates a relation among the three sides and the height of the second triangle TR2 having the base of the distance d and the height h from the base to the wireless tag 203. The expression 22 corresponds to a second triangle relational expression according to the present disclosure.

Two simultaneous equations of the expression 21 and the expression 22 are established, so that two unknown values included therein can be obtained. The expression 21 and the expression 22 originally include five unknown values, namely, the four numbers of phase periods k, m, n, and p and the height h.

These numbers of phase periods will thus be decreased to a single number of phase periods. The numbers of phase periods can be decreased to a single number of phase periods in a case where the distances $L1_{t1}$, $L2_{t1}$, $L1_{t2}$, and $L2_{t2}$ have differences therebetween corresponding to the range within $\pm\pi$ in terms of a phase, in other words, $\lambda/2$ or less. There is, however, a phase difference in each of an outward way and a homeward way. The differences thus need to further be halved. Specifically, the differences between the distances $L1_{t1}$, $L2_{t1}$, $L1_{t2}$, and $L2_{t2}$ thus need to be $\lambda/4$ or less.

With reference to the first triangle TR1, expression 23 is established because the first triangle TR1 is geometrically established.

$$|L2_{t1}-L1_{t1}|<d \qquad \text{Expression 23}$$

The expression 23 has a left member indicating the difference between the distances $L1_t$ and $L2_{t1}$. The value $|L2_{t1}-L1_{t1}|$ is thus constantly less than $\lambda/4$ if the value d is less than $\lambda/4$. When the expression 23 and $d<\lambda/4$ are established, the number of phase periods m in the expression relating to $L2_{t1}$ or the expression 18 can be replaced with the number of phase periods k in the expression relating to $L1_{t1}$ or the expression 17.

Similarly with reference to the second triangle TR2, expression 24 is established because the second triangle TR2 is geometrically established.

$$|L2_{t2}-L1_{t2}|<d \qquad \text{Expression 24}$$

According to the expression 24, the value $|L2_{t2}-L1_{t2}|$ is constantly less than $\lambda/4$ if the value d is less than $\lambda/4$. When the expression 24 and $d<\lambda/4$ are established, the number of phase periods p in the expression relating to $L2_{t2}$ or the expression 20 can be replaced with the number of phase periods n in the expression relating to $L1_{t2}$ or the expression 18. The numbers of phase periods are decreased to two numbers of phase periods, namely, the numbers of phase periods k and n.

Furthermore, a third triangle TR3 and a fourth triangle TR4 depicted in FIG. 16 will be considered. The third triangle TR3 is obtained by replacing the distance d of the first triangle TR1 with a distance R as the travel distance of the wireless tag 203 from the first time point t1 to the second time point t2. The fourth triangle TR4 is obtained by replacing the distance d of the second triangle TR2 with the distance R.

Similarly to the first triangle TR1 and the second triangle TR2, expression 25 is established because the third triangle TR3 is geometrically established, and expression 26 is established because the fourth triangle TR4 is geometrically established.

$$|L1_{t2}-L1_{t1}|<R \qquad \text{Expression 25}$$

$$|L2_{t2}-L2_{t1}|<R \qquad \text{Expression 26}$$

Similarly to the expression 23 and the expression 24, according to the expression 25, the value $|L1_{t2}-L1_{t1}|$ is constantly less than $\lambda/4$ if the value R is less than $\lambda/4$. According to the expression 26, the value $|L2_{t2}-L2_{t1}|$ is constantly less than $\lambda/4$ if the value R is less than $\lambda/4$.

When the expression 25 and $R<\lambda/4$ are established, the number of phase periods n in the expression relating to $L1_{t2}$ or the expression 19 can be replaced with the number of phase periods k in the expression relating to $L1_{t1}$ or the expression 16. The number of phase periods n has thus been replaced with the number of phase periods k.

The number of phase periods k can be obtained by solving the expression 21 and the expression 22. The height h can also be obtained.

The height h Is equal to the distance between the tag reader 10 and the wireless tag 203 positioned right therebelow, or the minimum value of the distance L. The minimum value of the distance L changes in accordance with whether the wireless tag 203 is moving along the passage 4 or the wireless tag 203 is moving on a different passage or off the passage. Whether the wireless tag 203 is moving along the passage 4 can thus be determined from the minimum value of the distance L, that is, the height h.

FIG. 14 will be described next. The phases α and β are acquired in S210. The phases γ and δ are acquired in S220. The processing in S210 and S220 is executed by a phase acquisition section according to the present disclosure.

Phase correction is executed in S230. The processing in S230 is executed by a phase correction section according to the present disclosure. Both the distances d and R according to the present embodiment are made to be less than $\lambda/4$, so that the phases α, β, γ, and δ have phase differences therebetween within the range from $-\pi$ to $\pi$. However, the phase calculated in S103 falls within the range from 0 to $2\pi$. The calculated phase may thus occasionally have a difference exceeding the range from $-\pi$ to $\pi$, from a reference phase. The phase correction is accordingly executed. The present embodiment sets the reference phase to the phase α. In an exemplary case where the phase α has 240 degrees and the phase β is behind the phase α by 130 degrees, the calculated phase β has 10 degrees. The phase β is corrected to 370 degrees obtained by adding 240 degrees and 130 degrees.

Figure 17:
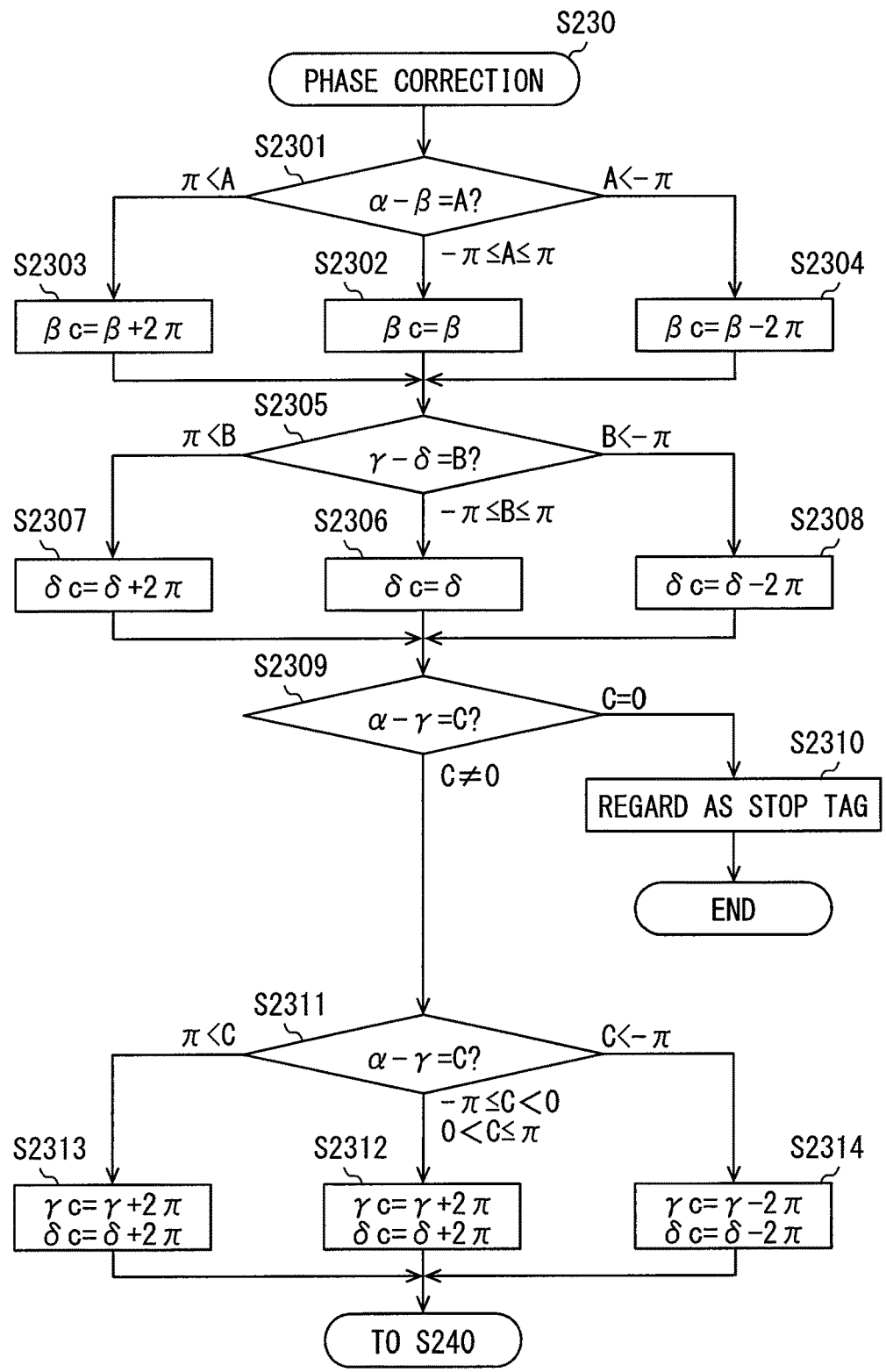
FIG. 17 is a flowchart of detailed processing in S230 of FIG. 14.

The phase correction includes the processing detailed in FIG. 17. In S2301, the value α–β is set to A that is compared with $-\pi$ and $\pi$. The flow proceeds to S2302 if $-\eta \leq A \leq \pi$ is established, with the value β applied to a corrected phase βc. The flow proceeds to S2303 if $\pi < A$ is established, with the corrected phase βc obtained by $\beta + 2\pi$. The flow proceeds to S2304 if $\pi < -A$ is established, with the corrected phase βc obtained by $\beta - 2\pi$.

The processing from S2301 to S2304 causes the corrected phase βc to fall within the range from $-\pi$ to $\pi$ with the phase α as a reference. The processing from S2301 to S2304 relates to correction based on the fact that the expression 23 and $d < \lambda/4$ are established. There is obtained expression 27 after execution of the processing from S2302 to S2304, with the number of phase periods m in the expression 18 replaced with the number of phase periods k.

$$L2_{t1} = 2\pi + \beta c \quad \text{Expression 27}$$

In S2305, the value γ–δ is set to B that is compared with $-\pi$ and $\pi$. The flow proceeds to S2306 if $-\pi \leq B \leq \pi$ it is established, with the value δ applied to a corrected phase δc. The flow proceeds to S2307 if $\pi < B$ is established, with the corrected phase δc obtained by $\delta + 2\pi$. The flow proceeds to S2308 If $B < -\pi$ is established, with the corrected phase δc obtained by $\delta - 2\pi$.

The processing from S2305 to S2308 causes the corrected phase δc to fall within the range from $-\pi$ to $\pi$ with the phase γ as a reference. The processing from S2305 to S2308 relates to correction based on the fact that the expression 24 and $d < \lambda/4$ are established. There Is obtained expression 28 after execution of the processing from S2307 to S2309, with the number of phase periods p in the expression 20 replaced with the number of phase periods n.

$$L2_{t2} = 2n\pi + \delta c \quad \text{Expression 28}$$

In S2309, the value α–γ is set to C to determine whether the value C is zero. The value C equal to zero indicates that the phase is not changed with elapse of time. If the value C is zero, the flow thus proceeds to S2310 with the wireless tag 203 assumed to be stopped. The processing ends if the processing in S2310 is executed, and the processing depicted in FIG. 13 is executed from the start after elapse of the transmission period.

If YES in the determination in S2309, the flow proceeds to S2311. The value C is compared with $-\pi$ and $\pi$ in S2311. The flow proceeds to S2312 if $-\pi \leq C < 0$ and $0 < C \leq \pi$ are established, with the values γ and δ applied to corrected phases γc and δc, respectively. The flow proceeds to S2313 if $\pi < C$ is established, with the corrected phase γc obtained by $\gamma + 2\pi$ and the corrected phase δc obtained by $\delta + 2\pi$. The flow proceeds to S2314 if $C < -\pi$ is established, with the corrected phase γc obtained by $\gamma - 2\pi$ and the corrected phase δc obtained by $\delta - 2\pi$.

The processing from S2311 to S2314 causes the corrected phases γc and δc to fall within the range from $-\pi$ to $\pi$ with the phase α as a reference. The processing from S2311 to S2314 relates to correction based on the fact that the expression 25 and $R < \lambda/4$ are established. There are obtained expression 29 and expression 30 after execution of the processing from S2312 to S2314, with the number of phase periods n in the expression 19 and the expression 28 replaced with the number of phase periods k.

$$L1_{t2} = 2k\pi + \gamma c \quad \text{Expression 29}$$

$$L2_{t2} = 2k\pi + \delta c \quad \text{Expression 30}$$

As described above, the expression 27, the expression 29, and the expression 30 are obtained with the distances $L2_{t1}$, $L1_{t2}$, and $L2_{t2}$ indicated by the number of phase periods k, as in the expression relating to $L1_{t1}$ or the expression 17. The description will refer again to FIG. 14.

The processing in S240 is executed by a distance formula determination section according to the present disclosure configured to determine distance formulae of the distances $L1_{t1}$, $L2_{t1}$, $L1_{t2}$, and $L2_{t2}$ indicated by the single number of phase periods k. The expression 17 corresponds to the distance formula of the distance $L1_{t1}$ Indicated by the number of phase periods k as described earlier for convenience of description. The expression 17 indicates the distance $L1_{t1}$ with use of the number of phase periods k and the phase α as a reference. The expression 27 corresponds to the distance formula of the distance $L2_{t1}$ indicated by the number of phase periods k. The expression 29 corresponds to the distance formula of the distance $L1_{t2}$ Indicated by the number of phase periods k. The expression 30 corresponds to the distance formula of the distance $L2_{t2}$ indicated by the number of phase periods k.

In S250, the four distance formulae determined in S240 are substituted in the expression 21 and the expression 22 to calculate the number of phase periods k. The value k is obtained by solving a cubic equation, although detailed solution will not be mentioned herein. There are thus obtained three solutions. The solution having an integer is an expected one out of the three solutions. The solution most approximate to an integer is adopted when there is no solution having an integer. The value k has an allowable range that can be determined beforehand. It Is because the communicable area and the wavelength λ are known. The expected solution can alternatively be obtained by excluding the solutions causing the value k not to fall within the allowable range.

The flow proceeds to S260 after the number of phase periods k is calculated. The processing in S260 Is executed by a height calculation section according to the present disclosure. In S260, the height h is calculated by substituting the value k in the expression 21 or the expression 22.

The subsequent processing in S270 is executed by a passage determination section according to the present disclosure. In S270, the height h is assumed to be equal to the minimum distance Lmin from the tag reader 10 to the line on which the wireless tag 203 is moving. If the height h falls within a constant range with respect to the beforehand stored minimum distance Lmin of the passage 4, the wireless tag 203 is regarded as being moving along the passage 4.

The present embodiment thus achieves identification of the wireless tag 203 moving on the set passage 4 with no need for any fixed tag.

Furthermore, the distances $L1_{t2}$ and $L2_{t2}$ are calculated by substituting the number of phase periods k in the expression 29 and the expression 30 and whether the distances $L1_{t2}$ and $L2_{t2}$ are approximate to the minimum distance Lmin is determined, to also determine whether the wireless tag 203 is passing the passing determination point 5 below the gate 202.

The present embodiment does not require transmission of the search wave having limited directivity, but is preferred to adopt expanded directivity. Such expanded directivity decreases failure in reading the wireless tag 203.

Fifth Embodiment

The fifth embodiment will be described next. In the description of the fifth and subsequent embodiments, constituent elements denoted by reference signs Identical to those already mentioned are regarded as being identical to the constituent elements denoted by those reference signs in the fourth embodiment unless otherwise specified. When only part of a configuration is described, the remaining part of the configuration can correspond to that described in the fourth embodiment.

Figure 18:
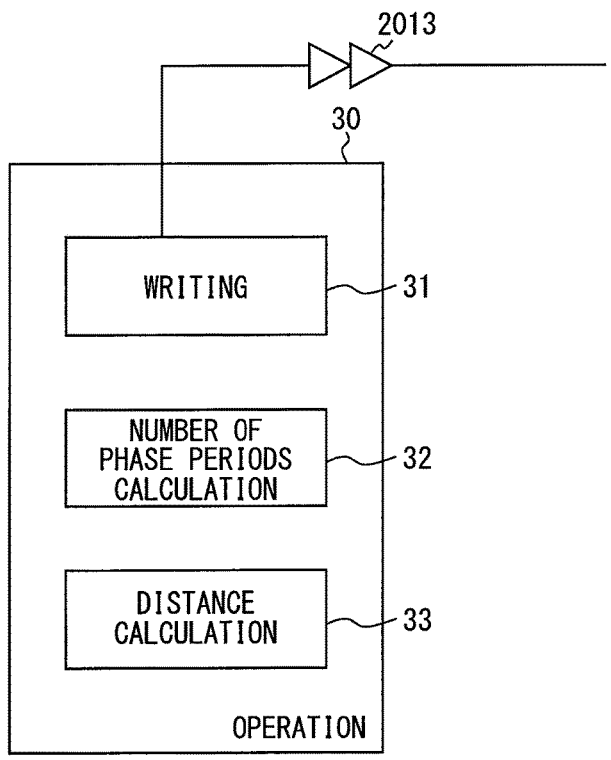
FIG. 18 is a block diagram illustrating functions of an operation portion according to a fifth embodiment.

As depicted in FIG. 18, the operation portion 30 according to the fifth embodiment includes, in addition to the functional blocks described in the fourth embodiment, a writing command portion 31 and a distance calculation portion 33. The processing in S250 is executed by a number of phase periods calculation portion 32.

Assume that the wireless tag 203 according to the present embodiment is a writable tag. The wireless tag 203 according to the fourth embodiment can be a read-only tag or a writable tag.

Figure 19:
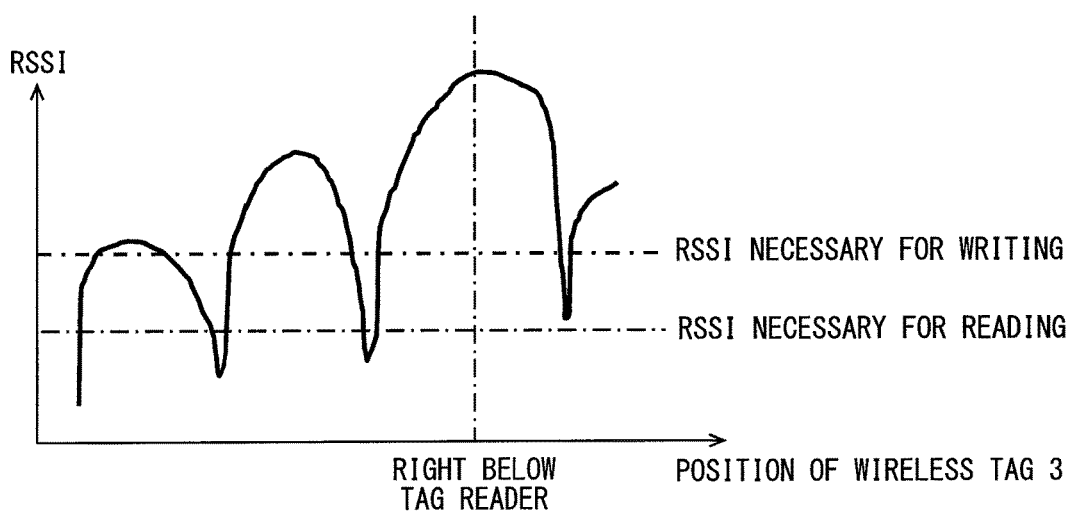
FIG. 19 is a diagram illustrating RSSI with respect to a position of a wireless tag, compared with RSSI necessary for reading and RSSI necessary for writing.

The writing command portion 31 causes the transmitter 2013 to transmit a writing command electric wave for information writing. FIG. 19 is a chart of RSSI with respect to the position of the wireless tag 203, as well as RSSI necessary for reading and RSSI necessary for writing. The tag reader 10 stores beforehand the relation indicated in FIG. 19 in the nonvolatile memory 40.

As indicated in FIG. 19, electric wave strength necessary for writing to the wireless tag 203 is higher than the RSSI necessary for reading the wireless tag 203. Information is preferably written to the wireless tag 203 when the wireless tag 203 is positioned to enable reception of the writing command electric wave at reception signal strength necessary for writing. There is thus calculated a current distance of the wireless tag 203.

In order to calculate the current distance, the number of phase periods calculation portion 32 substitutes the four distance formulae determined in S240 in the expression 21 and the expression 22 to obtain the unknown number of phase periods k.

The distance calculation portion 33 substitutes the number of phase periods k in the expression 29 and the expression 30 to calculate the distances $L1_{t2}$ and $L2_{t2}$ at the second time point t2. The second time point t2 corresponds to the latter time point, so that the distances $L1_{t2}$ and $L2_{t2}$ at the second time point t2 each correspond to the current distance. Only one of the distances $L1_{t2}$ and $L2_{t2}$ can alternatively be calculated.

It is possible to find the position of the wireless tag 203 when the current distance of the wireless tag 203 moving along a passage is known. The writing command portion 31 thus transmits the writing command electric wave when determining that the wireless tag 203 is positioned to enable reception of the writing command electric wave at reception signal strength necessary for writing. Such a position enabling reception of the writing command electric wave at reception signal strength necessary for writing corresponds to portions of a solid line located above a dashed line in FIG. 19. In particular, the writing command electric wave is preferably transmitted when the wireless tag 203 is adjacent to right below the tag reader 10. The writing command portion 31 transmits the writing command electric wave when determining that the wireless tag 203 is positioned to enable reception of the writing command electric wave at reception signal strength necessary for writing, for lower possibility of writing failure.

Sixth Embodiment

Figure 20:
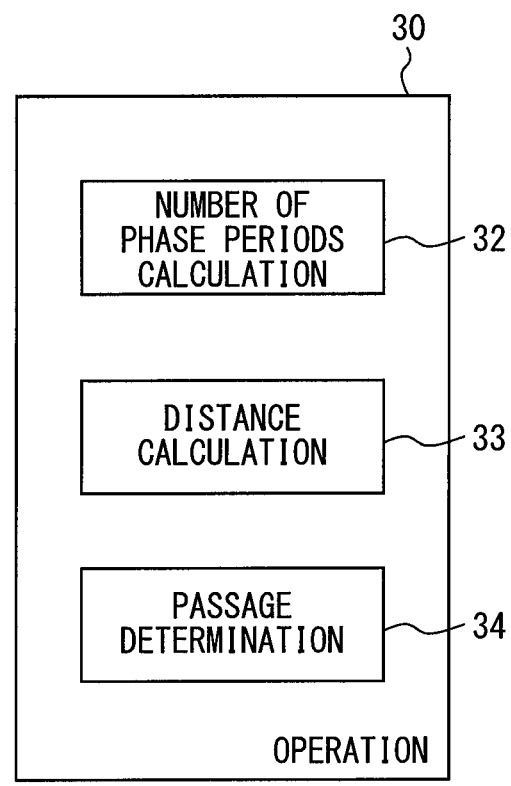
FIG. 20 is a block diagram illustrating an operation portion according to a sixth embodiment.

As depicted in FIG. 20, the operation portion 30 according to the sixth embodiment includes the number of phase periods calculation portion 32, the distance calculation portion 33, and a passage determination section 34. The number of phase periods calculation portion 32 and the distance calculation portion 33 are configured identically with those according to the fifth embodiment.

The distance calculation portion 33 is configured to calculate the current distance to the wireless tag 203. The distance alone is, however, insufficient for reliable determination that the wireless tag 203 is moving along the passage 4. When the wireless tag 203 is closer in the height direction by a distance equal to the distance from the passage 4, the wireless tag 203 positioned off the passage 4 will have the same distance as that of the wireless tag 203 moving along the passage 4.

In view of this, multiple wireless tags 203 are affixed to a single packing box 6 so as to cross the passage 4, preferably be perpendicular to the longitudinal direction of the passage 4.

The passage determination section 34 determines whether a current distance calculated for each the of the wireless tags 203 affixed to the single packing box 6 and the beforehand stored minimum distance Lmin to the passage 4 have a difference not exceeding a predetermined distance. The predetermined distance is appropriately set for determination that the wireless tag 203 is closest to the tag reader 10. Whether the multiple wireless tags 203 are affixed to the identical packing box 6 is determined by reading IDs assigned for distinction of the wireless tags 203 affixed to the Identical packing box 6.

Figure 21:
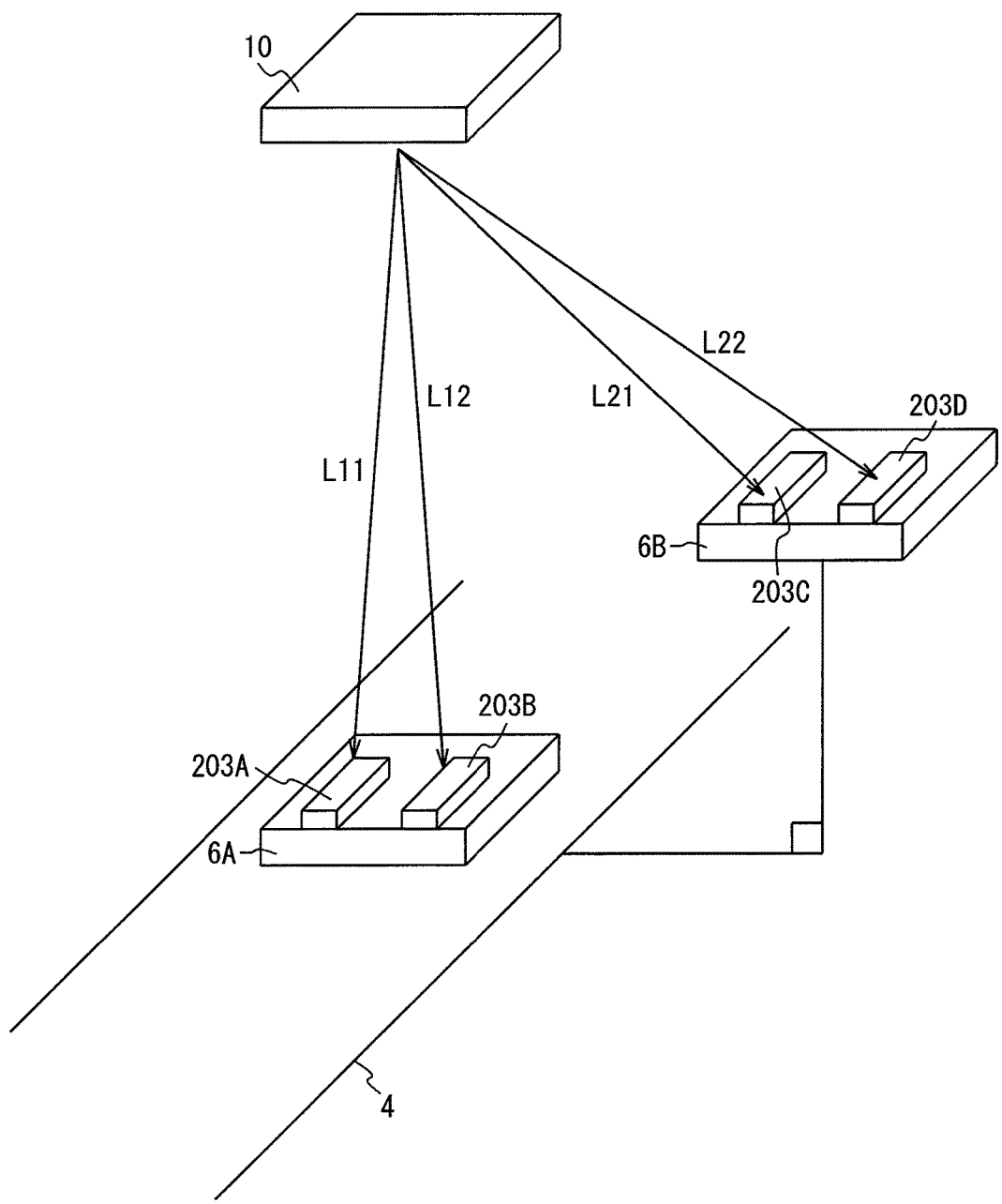
FIG. 21 is a diagram illustrating a relation between a tag reader and a wireless tag in the sixth embodiment.

FIG. 21 depicts a packing box 6A positioned right below the tag reader 10. FIG. 21 also depicts a packing box 6B that is positioned identically in the longitudinal direction of the passage with the packing box 6A, but is positioned off the passage 4 and higher than the packing box 6A.

Assume that wireless tags 203A, 203B, 203C, and 203D have distances L11, L12, L21, and L22 to the tag reader 10, respectively. The distances L11, L12, and L21 are substantially equal. In a case where only the wireless tag 203A is affixed to the packing box 6A and only the wireless tag 203C is affixed to the packing box 6B, whether the wireless tags 203A and 203C are located at the packing box 6A or the packing box 6B cannot be determined from the distances L11 and L21.

However, the distance L22 is longer than the distance L21 whereas the distances L11 and L12 are similar to each other. In view of this, the passage determination section 34 also determines whether the differences between the current distances calculated for the multiple wireless tags 203 are at most a reference distance difference. The reference distance difference exemplarily has a value obtained by adding a measurement error to the maximum value of a variation range of the differences between the current distances calculated for the multiple wireless tags 203 moving along the passage 4.

The wireless tags 203C and 203D affixed to the packing box 6B moving off the passage 4 have the current distances different from each other even when the wireless tags 203C and 203D are closest to the tag reader 10. In contrast, the wireless tags 203A and 203B affixed to the packing box 6A moving along the passage 4 have the current distances close to the minimum distance to the passage 4 when the wireless tags 203A and 203B are closest to the tag reader 10. This configuration thus achieves accuracy improvement in determination of whether the wireless tags 203 are moving along the passage.

The embodiments of the present disclosure are described above, although the present disclosure is not limited to the embodiments but the following modification examples are to be included in the technical scope of the present disclosure. The present disclosure is also applicable with various modifications, in addition to the followings, made within the scope not departing from the purpose thereof.

Second Modification Example

A transmission antenna and a reception antenna are not necessarily provided for common use. The transmission antenna can alternatively be provided separately from the reception antenna.

Third Modification Example

The reference phase is not limited to the phase α. The reference phase can be set appropriately.

Fourth Modification Example

The fourth embodiment can alternatively include obtaining only the height h without calculation of the number of phase periods k.

The present disclosure refers to the fact that a reception wave has a phase determined in accordance with a propagation distance and not in accordance with time and a wireless tag moves on a line. The phase of the reception wave is determined in accordance with the propagation distance.

Between time points close to each other while directions from the wireless tag moving on the line to the tag reader can be regarded as being parallel, there is shaped a right angled triangle having an oblique side configured by a travel locus of the wireless tag moved during the two time points and one of interior angles configured by a tag angle. The tag angle is formed between a straight line connecting an antenna included in the tag reader and the wireless tag, and the line on which the wireless tag is moving.

The right angled triangle has an adjacent side of the tag angle, which is as long as a half of a difference between the propagation distances. The phase of the reception wave is determined in accordance with the propagation distance, so that the half of the difference between the propagation distances, in other words, the length of the adjacent side, is determined in accordance with the phase difference between the reception waves at the two time points. The tag angle can then be calculated from the length of the oblique side and the length of the adjacent side.

In this manner, a single tag angle can be calculated from a single phase difference. Calculation of two phase differences enables calculation of a first tag angle and a second tag angle as tag angles at two positions of the wireless tag moving on the line.

When the tag angles at the two time points of the wireless tag moving on the line and a distance (tag travel distance) from the position of the wireless tag having the first tag angle to the position of the wireless tag having the second tag angle are found, angles at both ends of a side having the tag travel distance can be determined. There is thus determined a triangle that has the side having the tag travel distance and an apex set by the tag reader. The triangle has a height equal to the antenna-tag minimum distance that is accordingly calculated.

The wireless tag moving on a set line has the antenna-tag minimum distance that will be determined in accordance with the line. It is thus possible to identify, in accordance with the antenna-tag minimum distance, the wireless tag moving on the set line and an object having the wireless tag affixed thereto. The antenna-tag minimum distance is calculated with no use of any fixed tag. This configuration thus enables identification of the object moving on the set line with no need for any fixed tag.

The tag reader according to the present disclosure may Include a storage portion that stores line moving speed beforehand. The tag angle calculation section may be configured to calculate the tag travel distance from a time difference between the two time points and the line moving speed stored in the storage portion. The tag distance calculation section may be configured to calculate the distance between the position at the tag angle having the first tag angle and the position at the tag angle having the second tag angle, from the time difference between the time point at the tag angle having the first tag angle and the time point at the tag angle having the second tag angle, and the line moving speed stored in the storage portion.

The line moving speed is stored in the storage portion in this configuration. In other words, the line moving speed is known. Calculation of the tag angle requires the travel distance of the wireless tag between the two time points. Calculation of the antenna-tag minimum distance requires the distance between the position at the tag angle having the first tag angle and the position at the tag angle having the second tag angle. The present disclosure refers to the line moving speed stored in the storage portion for calculation of these distances.

Travel speed of the wireless tag may be calculated as follows.

The tag reader according to the present disclosure may further include: a storage portion that stores an antenna-line distance as a minimum distance from the antenna to the line; a second phase difference calculation section that calculates a phase difference calculated for a switching point of a phase gradient code as a time point in accordance with the phase calculated sequentially by the phase calculation section; a second tag distance calculation section that calculates an antenna-tag distance as a distance from the antenna to the wireless tag at a code switching adjacent time point as another time point for calculation of the phase difference together with the switching point of the phase gradient code in accordance with the antenna-line distance stored in the storage portion and the phase difference calculated by the second phase difference calculation section; a second tag angle calculation section that calculates a tag angle at the code switching adjacent time point in accordance with the antenna-tag distance calculated by the second tag distance calculation section and the antenna-line distance stored in the storage portion; a travel distance calculation section that calculates a travel distance from a position of the wireless tag at the code switching adjacent time point to a position of the wireless tag at the switching point of the phase gradient code in accordance with the tag angle calculated by the second tag angle calculation section, the antenna-tag distance calculated by the second tag distance calculation section, and the antenna-line distance stored in the storage portion; and a speed calculation section that calculates travel speed of the wireless tag in accordance with the travel distance calculated by the travel distance calculation section and a time difference between the code switching adjacent time point and the switching point of the phase gradient code. The tag angle calculation section may calculate the travel distance of the wireless tag between the two time points from the time difference between the two time points and the travel speed of the wireless tag calculated by the speed calculation section. The tag distance calculation section may calculate the distance between the position at the tag angle having the first tag angle and the position at the tag angle having the second tag angle, from the time difference between the time point at the tag angle having the first tag angle and the time point at the tag angle having the second tag angle, and the travel speed of the wireless tag calculated by the speed calculation section. The tag reader may further include a line determination section that determines whether the wireless tag is moving on a preset line in accordance with comparison between the antenna-tag minimum distance calculated by the tag distance calculation section and the antenna-line distance stored in the storage portion.

The phase of the reception wave is determined by the propagation distance. The phase gradient code indicating increase or decrease of the phase difference is inverted in the positive or negative state between a case where the antenna-tag distance is gradually decreasing and a case where the antenna-tag distance is gradually increasing.

The wireless tag having inversion of the phase gradient code is positioned to have the antenna-tag distance of the minimum value that is equal to the antenna-line distance. The antenna-line distance is stored in the present disclosure, so that the antenna-tag distance at the phase switching point is known.

Before and after the switching point of the phase gradient code, the antenna-tag distance is determined by the antenna-line distance and the phase difference. The second tag distance calculation section accordingly calculates the antenna-tag distance at the code switching adjacent time point from the phase difference calculated at the switching point of the phase gradient code and the antenna-line distance stored in the storage portion.

The antenna-tag distance at the code switching adjacent time point is found, and the antenna-tag distance at the switching point of the phase gradient code is found to be equal to the antenna-line distance. It is thus possible to geometrically calculate the distance between the position of the wireless tag at the code switching adjacent time point and the position of the wireless tag at the switching point of the phase gradient code.

The speed calculation section can calculate the travel speed of the wireless tag because there are known the distance between the position of the wireless tag at the code switching adjacent time point and the position of the wireless tag at the switching point of the phase gradient code and the time difference between the code switching adjacent time point and the switching point of the phase gradient code.

The travel speed of the wireless tag can be calculated in this manner, and the tag angle calculation section thus calculates the travel distance of the wireless tag between the two time points in accordance with the travel speed of the wireless tag calculated by the speed calculation section. A line distance calculation portion calculates the travel distance between the position at the tag angle having the first tag angle and the position at the tag angle having the second tag angle in accordance with the travel speed of the wireless tag calculated by the speed calculation section.

According to the present disclosure, whether the wireless tag is moving on the preset line is determined on the basis of the fact that the antenna-tag minimum distance can be calculated and the antenna-line distance is stored.

The tag reader according to the present disclosure may further include a storage portion that stores the antenna-line distance as the minimum distance from the antenna to the line, and a line determination section that determines whether the wireless tag is moving on the preset line in accordance with comparison between the antenna-tag minimum distance calculated by the tag distance calculation section and the antenna-line distance stored in the storage portion.

The present disclosure further provides the line determination section.

The tag reader according to the present disclosure may further Include a stop determination section that determines stop of the wireless tag if there is no change in phase calculated sequentially by the phase calculation section.

The present disclosure enables obtaining the antenna-tag minimum distance and also determination of whether the wireless tag is stopped.

The transmission antenna transmits, at the first time point and the second time point, the search wave toward the passing determination area of the passage for determination of whether the wireless tag is moving therealong. The wireless tag having received the search wave returns the response wave to the tag reader. The response wave is received by the first reception antenna and the second reception antenna.

The wireless tag, the first reception antenna, and the second reception antenna shape an angle. The triangle shaped at the first time point will be called the first triangle whereas the triangle shaped at the second time point will be called the second triangle.

The first triangle has unknown distances, and the second triangle has unknown distances. Change of these four distances is reflected on phase change. The present disclosure thus includes estimation of these distances from the phases of the response waves received by the first reception antenna and the second reception antenna at the first and second time points.

The number of phase periods needs to be obtained for calculation of these distances from the phases. If the numbers of phase periods in these distances are all unknown, such a large number of the unknown values inhibits obtaining the unknown values.

The first reception antenna and the second reception antenna according to the present disclosure are thus disposed such that the distance therebetween is equal to or less than one fourth of the wavelength of the search wave in the longitudinal direction of the passage. Furthermore, the second time point Is set to be after transmission of the search wave from the transmission antenna and before the travel distance of the wireless tag becomes equal to or more than one fourth of the wavelength of the search wave. As to be described in detail later, the differences between the distances are equal to or less than a single phase period due to these restrictions.

The numbers of phase periods are not necessarily identical even when the differences between the distances are equal to or less than the single phase period. With one of the distances as a reference, the numbers of phase periods of the remaining distances are possibly shifted by a single phase from the number of phase periods of the reference distance. The phase correction section accordingly corrects the phase differences between the four phases acquired by the phase acquisition section to be included within the single phase period. It is thus possible to determine the phases with the same numbers of phase periods equalized to one another. The distances are indicated by the corrected phases and the reference phase.

The first triangle and the second triangle have the sides each including the unknown value indicated only by the number of phase periods, and the first triangle and the second triangle are equal in height. With establishment of the first triangle relational expression indicating the three sides and the height of the first triangle and the second triangle relational expression indicating the three sides and the height of the second triangle, the simultaneous equations are solved to obtain the height of the first and second triangles.

The height indicates the minimum distance from the tag reader to the line on which the wireless tag is moving. It is thus possible to determine, in accordance with the height, whether the wireless tag is moving on a determination target passage.

Whether the wireless tag is moving along the determination target passage can be determined in this manner. The wireless tag moving along the set passage can thus be identified with no need for any fixed tag.

The tag reader according to the present disclosure may further include: a writing command portion that transmits, to the wireless tag, a writing command electric wave for Information writing; a number of phase periods calculation portion that obtains the unknown number of phase periods by substituting the four distance formulae determined by the distance formula determination section in the first triangle relational expression and the second triangle relational expression; and a distance calculation portion that calculates a current distance as at least one of the distance between the wireless tag and the first reception antenna at the second time point and the distance between the wireless tag and the second reception antenna at the second time point in accordance with the number of phase periods calculated by the number of phase periods calculation portion. The writing command portion may transmit the writing command electric wave when determining that the wireless tag is positioned to enable reception of the writing command electric wave at reception signal strength necessary for writing in accordance with the current distance.

Electric wave strength necessary for writing to the wireless tag is higher than electric wave strength necessary for reading the wireless tag. Information is preferably written to the wireless tag when the wireless tag Is positioned to enable reception of the writing command electric wave at reception signal strength necessary for writing.

The present disclosure accordingly includes calculation of the current distance of the wireless tag. The unknown number of phase periods is obtained for the calculation of the current distance. The distance at the second time point is calculated in accordance with the number of phase periods. The second time point corresponds to a latter time point, so that the distance at the second time point indicates the current distance.

When the wireless tag is moving along the passage and the current distance is known, the position of the wireless tag is obtained. The writing command portion transmits the writing command electric wave when determining that the wireless tag is positioned to enable reception of the writing command electric wave at reception signal strength necessary for writing. This configuration reduces possibility of writing failure.

According to the present disclosure, multiple wireless tags may be affixed to an object moving along the passage, so as to cross the passage. The tag reader may include: a number of phase periods calculation portion that obtains the unknown number of phase periods by substituting the four distance formulae determined by the distance formula determination section in the first triangle relational expression and the second triangle relational expression; and a distance calculation portion that calculates a current distance as at least one of the distance between the wireless tag and the first reception antenna at the second time point and the distance between the wireless tag and the second reception antenna at the second time point in accordance with the number of phase periods calculated by the number of phase periods calculation portion. The passage determination section may determine, when current distances can be calculated for multiple wireless tags, that the multiple wireless tags is moving along the passage in accordance with the fact that the current distances calculated for the multiple wireless tags and the beforehand stored minimum distance to the passage have differences equal to or less than a predetermined distance and the differences from the current distances calculated for the multiple wireless tags are equal to or less than a reference distance difference.

The distance calculation portion is configured to calculate the current distances to the wireless tags. The distances alone are, however, insufficient for reliable determination that the wireless tags are moving along the passage. When each of the wireless tags is closer in the height direction by a distance equal to the distance from the passage, the wireless tag positioned off the passage will have the same distance as that of the wireless tag moving along the passage.

In view of this, the present disclosure includes determination of whether the current distances calculated for the multiple wireless tags and the beforehand stored minimum distance to the passage have distances not exceeding the predetermined distance. The present disclosure also includes determination of whether the differences from the current distances calculated for the multiple wireless tags are at most the reference distance difference.

The multiple wireless tags affixed to an object moving off the passage has the current distances different from each other even when the wireless tags are closest to the tag reader. In contrast, the multiple wireless tags affixed to an object moving along the passage has the current distances close to the minimum distance to the passage when the wireless tags are closest to the tag reader. This configuration thus achieves accuracy improvement in determination of whether the wireless tags are moving along the passage.

The flowcharts included or the processing in the flowcharts in the present application includes multiple steps (or referred to as sections) each referred to as S10 or the like. Each of the steps can be divided into multiple substeps, whereas multiple steps can be combined to a single step.

The embodiments, the configurations, and the modes of a tag reader according to an aspect of the present disclosure are exemplarily described above. The embodiments, the configurations, and the modes of the present disclosure are, however, not to be limited to each of the embodiments, each of the configurations, and each of the modes described above. For example, the scope of the embodiments, the configurations, and the modes of the present disclosure includes any embodiment, any configuration, and any mode achieved by appropriately combining technical portions disclosed in different embodiments, different configurations, and different modes.

What is claimed is:

1. A tag reader communicating with a wireless tag, the tag reader comprising:
    a phase calculation section that sequentially calculates a phase of a reception wave as an electric wave transmitted from the wireless tag and received by the tag reader in response to an electric wave transmitted to the wireless tag;
    a phase difference calculation section that calculates a phase difference as a difference of phases calculated at two time points by the phase calculation section; and
    a tag angle calculation section that calculates a tag angle as an angle between a straight line connecting an antenna included in the tag reader and the wireless tag and a line on which the wireless tag is moving, in accordance with the phase difference and a tag travel distance as a travel distance of the wireless tag during the two time points,
    wherein:
    the phase difference calculation section calculates two values of the phase difference with at least one of the two time points for calculation of the phase difference being set to a different time point;
    the tag angle calculation section calculates a first tag angle and a second tag angle each as the tag angle in accordance with the two values of the phase difference; and
    the tag reader further comprises
        a tag distance calculation section that calculates an antenna-tag minimum distance as a minimum distance from the line on which the wireless tag is moving to the antenna in accordance with a distance between a position at the tag angle having the first tag angle and a position at the tag angle having the second tag angle, the first tag angle, and the second tag angle.

2. The tag reader according to claim 1, further comprising:
    a storage portion that stores moving speed of the line beforehand,
    wherein:
    the tag angle calculation section calculates the tag travel distance in accordance with a time difference between the two time points and the moving speed of the line stored in the storage portion; and
    the tag distance calculation section calculates the distance between the position at the tag angle having the first tag angle and the position at the tag angle having the second tag angle, in accordance with the time difference between the time point at the tag angle having the first tag angle and the time point at the tag angle having the second tag angle, and the moving speed of the line stored in the storage portion.

3. The tag reader according to claim 1, further comprising:
    a storage portion that stores an antenna-line distance as a minimum distance from the antenna to the line;
    a second phase difference calculation section that calculates the phase difference calculated with a switching point of a phase gradient code being set to a time point, in accordance with the phase calculated sequentially by the phase calculation section;
    a second tag distance calculation section that calculates an antenna-tag distance as a distance from the antenna to the wireless tag at a code switching adjacent time point as another time point for calculation of the phase difference together with the switching point of the phase gradient code, in accordance with the antenna-line distance stored in the storage portion and the phase difference calculated by the second phase calculation section;
    a second tag angle calculation section that calculates the tag angle at the code switching adjacent time point in accordance with the antenna-tag distance calculated by the second tag distance calculation section and the antenna-line distance stored in the storage portion;
    a travel distance calculation section that calculates the travel distance from a position of the wireless tag at the code switching adjacent time point to a position of the wireless tag at the switching point of the phase gradient code, in accordance with the tag angle calculated by the second tag angle calculation section, the antenna-tag distance calculated by the second tag distance calculation section, and the antenna-line distance stored in the storage portion; and
    a speed calculation section that calculates travel speed of the wireless tag in accordance with the travel distance calculated by the travel distance calculation section and a time difference between the code switching adjacent time point and the switching point of the phase gradient code,
    wherein:
    the tag angle calculation section calculates the travel distance of the wireless tag during the two time points in accordance with the time difference between the two time points and the travel speed of the wireless tag calculated by the speed calculation section;
    the tag distance calculation section calculates the distance between the position at the tag angle having the first tag angle and the position at the tag angle having the second tag angle, in accordance with a time difference between a time point at the tag angle having the first tag angle and a time point at the tag angle having the second tag angle, and the travel speed of the wireless tag calculated by the speed calculation section; and
    the tag reader further comprises
        a line determination section that determines whether the wireless tag is moving on a preset line, in accordance with comparison between the antenna-tag minimum distance calculated by the tag distance calculation section and the antenna-line distance stored in the storage portion.

4. The tag reader according to claim 1, further comprising:
a storage portion that stores an antenna-line distance as a minimum distance from the antenna to the line; and
a line determination section that determines whether the wireless tag is moving on a preset line, in accordance with comparison between the antenna-tag minimum distance calculated by the tag distance calculation section and the antenna-line distance stored in the storage portion.

5. The tag reader according to claim 1, further comprising:
a stop determination section that determines stop of the wireless tag when the phase calculated sequentially by the phase calculation section has no change.

6. A tag reader comprising:
a transmission antenna that transmits a search wave having a preset frequency to a passing determination area of a passage to be determined whether at least one wireless tag is moving on;
a first reception antenna and a second reception antenna that are disposed to be distant from each other by one fourth of a wavelength of the search wave or less in a longitudinal direction of the passage so as to receive a response wave transmitted in response to the search wave from the wireless tag located in the passing determination area;
a transmission control section that causes the transmission antenna to transmit the search wave at a first time point and then causes the transmission antenna to transmit the search wave at a second time point before the wireless tag has a travel distance reaching or exceeding one fourth of the wavelength of the search wave;
a phase acquisition section that acquires phases of the response wave transmitted from the wireless tag in response to the search wave transmitted from the transmission antenna at the first time point and received by the first reception antenna and the second reception antenna, and phases of the response wave transmitted from the wireless tag in response to the search wave transmitted from the transmission antenna at the second time point and received by the first reception antenna and the second reception antenna;
a phase correction section that corrects three out of four phases with a remaining one of the phases as a reference phase such that phase differences between the four phases acquired by the phase acquisition section are within a single period of the phase;
a distance formula determination section that indicates, in four distance formulae including an identical number of phase periods having an unknown value, a distance between the wireless tag at the first time point and the first reception antenna, a distance between the wireless tag at the first time point and the second reception antenna, a distance between the wireless tag at the second time point and the first reception antenna, and a distance between the wireless tag at the second time point and the second reception antenna, in accordance with corrected phases obtained by correcting the phases by the phase correction section and the reference phase;
a height calculation section that calculates a height of each of a first triangle and a second triangle, by substituting the four distance formulae determined by the distance formula determination section in a first triangle relational expression indicating a relation among three sides and the height of the first triangle defined by a position of the first reception antenna, a position of the second reception antenna, and a position of the wireless tag at the first time point and having a base between the first reception antenna and the second reception antenna and the height from the base to the position of the wireless tag, and in a second triangle relational expression indicating three sides and the height of the second triangle defined by the position of the first reception antenna, the position of the second reception antenna, and a position of the wireless tag at the second time point, and having a base between the first reception antenna and the second reception antenna and the height from the base to the position of the wireless tag; and
a passage determination section that determines whether the wireless tag is moving along the passage assuming that the height calculated by the height calculation section is a minimum distance from the tag reader to a route along which the wireless tag is moving.

7. The tag reader according to claim 6, further comprising:
a writing command portion that transmits, to the wireless tag, a writing command electric wave for information writing;
a number of phase periods calculation portion that obtains the number of phase periods having the unknown value by substituting the four distance formulae determined by the distance formula determination section in the first triangle relational expression and the second triangle relational expression; and
a distance calculation portion that calculates a current distance as at least one of the distance between the wireless tag at the second time point and the first reception antenna and the distance between the wireless tag at the second time point and the second reception antenna in accordance with the number of phase periods calculated by the number of phase periods calculation portion,
wherein:
the writing command portion transmits the writing command electric wave upon determination according to the current distance that the wireless tag is positioned to enable reception of the writing command electric wave at reception signal strength necessary for writing.

8. The tag reader according to claim 6, wherein:
the at least one wireless tag includes a plurality of wireless tags affixed to an object moving along the passage so as to cross the passage;
the tag reader further comprises
a number of phase periods calculation portion that obtains the number of phase periods having the unknown value by substituting the four distance formulae determined by the distance formula determination section in the first triangle relational expression and the second triangle relational expression, and
a distance calculation portion that calculates a current distance as at least one of the distance between the wireless tag at the second time point and the first reception antenna and the distance between the wireless tag at the second time point and the second reception antenna in accordance with the number of phase periods calculated by the number of phase periods calculation portion; and
the passage determination section determines that the plurality of wireless tags are moving along the passage in accordance with a case that, when the current distance is calculated for each of the wireless tags, the current distance calculated for each of the wireless tags and a beforehand stored minimum distance to the passage have a difference equal to or less than a predetermined distance and current distances calculated for the plurality of wireless tags have differences equal to or less than a reference distance difference.

9. A tag reader communicating with a wireless tag, the tag reader comprising:
- a phase calculation section that sequentially calculates a phase of a reception wave as an electric wave transmitted from the wireless tag and received by the tag reader in response to an electric wave transmitted to the wireless tag;
- a phase difference calculation section that calculates a phase difference as a difference of phases calculated at two time points by the phase calculation section; and
- a tag angle calculation section that calculates a tag angle as an angle between a straight line connecting an antenna included in the tag reader and the wireless tag and a line on which the wireless tag is moving, in accordance with the phase difference and a tag travel distance as a travel distance of the wireless tag during the two time points, wherein:
the phase calculation section calculates a first phase at a first time point, a second phase at a second time point, a third phase at a third time point, and a fourth phase at a fourth time point, the first time point, the second time point, the third time point, and the fourth time point being three or four different time points;
the phase difference calculation section calculates a first phase difference which is a difference between the first phase and the second phase, and a second phase difference which is a difference between the third phase and the fourth phase;
the tag angle calculation section calculates a first tag angle from the first phase difference, and a second tag angle from the second phase difference as two tag angles in accordance with the two values of the phase difference; and
the tag reader further comprises
a tag distance calculation section that calculates an antenna-tag minimum distance as a minimum distance from the line on which the wireless tag is moving to the antenna in accordance with (i) a distance between a position on the line at the tag angle having the first tag angle and a position on the line at the tag angle having the second tag angle, (ii) the first tag angle, and (iii) the second tag angle.

* * * * *